(12) United States Patent
Nagao et al.

(10) Patent No.: US 8,126,321 B2
(45) Date of Patent: Feb. 28, 2012

(54) IMAGING EQUIPMENT, PHOTOGRAPHIC SETTING DETERMINATION METHOD, AND PHOTOGRAPHIC SETTING DETERMINATION PROGRAM

(75) Inventors: Kenichiro Nagao, Tokyo (JP); Shunji Okada, Kanagawa (JP); Takashi Kuwabara, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/798,779

(22) Filed: Apr. 9, 2010

(65) Prior Publication Data
US 2010/0266269 A1   Oct. 21, 2010

(30) Foreign Application Priority Data

Apr. 21, 2009   (JP) .............................. P2009-103144

(51) Int. Cl.
*G03B 17/00* (2006.01)
(52) U.S. Cl. ........................................................ 396/49
(58) Field of Classification Search .................. 396/49, 396/277
See application file for complete search history.

(56) References Cited

U.S. PATENT DOCUMENTS

| | | | | |
|---|---|---|---|---|
| 6,031,999 A * | 2/2000 | Ogawa | ......................... | 396/303 |
| 7,277,131 B2 * | 10/2007 | Wakabayashi | ........... | 348/333.02 |
| 7,623,176 B2 * | 11/2009 | Hoshino et al. | .......... | 348/333.02 |
| 7,707,239 B2 * | 4/2010 | Anderson et al. | ............. | 709/202 |
| 2002/0085111 A1 * | 7/2002 | Heiman | .................... | 348/333.01 |
| 2003/0063194 A1 * | 4/2003 | Nishiyama et al. | ........ | 348/207.1 |
| 2003/0081126 A1 * | 5/2003 | Seaman et al. | ............. | 348/207.1 |
| 2005/0088542 A1 * | 4/2005 | Stavely et al. | ................ | 348/239 |
| 2008/0025128 A1 * | 1/2008 | Oh et al. | ................... | 365/230.03 |
| 2008/0298796 A1 * | 12/2008 | Kuberka et al. | ............... | 396/263 |
| 2008/0317456 A1 * | 12/2008 | Lee et al. | ...................... | 396/321 |
| 2009/0162042 A1 * | 6/2009 | Wexler et al. | .................. | 396/49 |

FOREIGN PATENT DOCUMENTS

JP           2003-348519 A        12/2003

* cited by examiner

*Primary Examiner* — Clayton E Laballe
*Assistant Examiner* — Leon W Rhodes, Jr.
(74) *Attorney, Agent, or Firm* — Lerner, David, Littenberg, Krumholz & Mentlik, LLP

(57) ABSTRACT

Imaging equipment includes: a position acquisition unit that acquires a current position; a memory unit in which a plurality of pieces of setting information representing photographic settings suitable for photography at positions and being associated in advance with the positions is stored; a control unit that reads setting information, which represents a photographic setting suitable for photography at the current position acquired by the position acquisition unit, from the memory unit, and determines a photographic setting according to the setting information; and an imaging unit that images a subject according to the photographic setting determined by the control unit.

10 Claims, 14 Drawing Sheets

EXAMPLE OF DISPLAY FOR PROMPTING PHOTOGRAPHY

FIG.1
APPEARANCE OF DIGITAL STILL CAMERA (DSC)
1 DIGITAL STILL CAMERA (DSC)
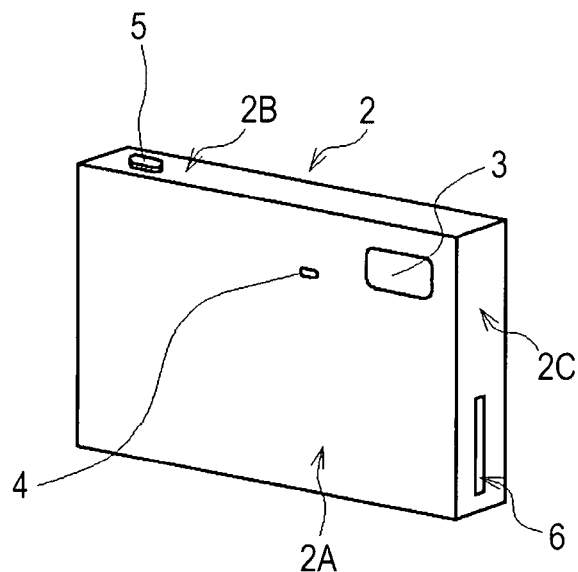
(A) FRONT SIDE
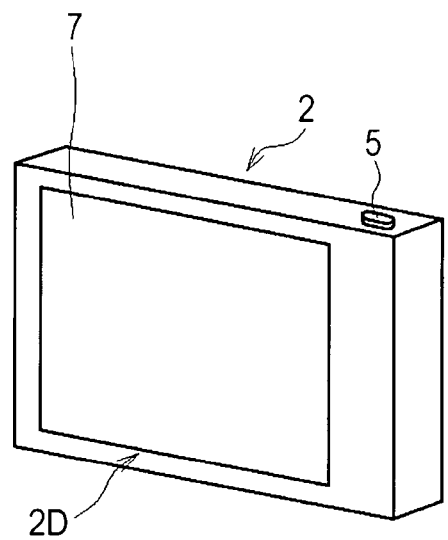
(B) BACK SIDE

HARDWARE CONFIGURATION OF DSC

FIG.3
STRUCTURE OF AUTONOMOUS SETTING FILE

32

| MANAGEMENT_TABLE | | | | |
|---|---|---|---|---|
| GENERAL_INFO | | VERSION | ASCII | VERSION |
| | | NUM_OF_INDEX | SHORT | SUM TOTAL OF INDICES |
| INDEX_SEARCH_TABLE | | AREA_INDEX1 | SHORT | REGIONAL REPRESENTATIVE INDEX#1 |
| | | AREA_INDEX2 | SHORT | REGIONAL REPRESENTATIVE INDEX#2 |
| | | AREA_INDEX3 | SHORT | REGIONAL REPRESENTATIVE INDEX#3 |
| | | AREA_INDEX4 | SHORT | REGIONAL REPRESENTATIVE INDEX#4 |
| | | AREA_INDEX5 | SHORT | REGIONAL REPRESENTATIVE INDEX#5 |
| | | AREA_INDEX6 | SHORT | REGIONAL REPRESENTATIVE INDEX#6 |
| | | AREA_INDEX7 | SHORT | REGIONAL REPRESENTATIVE INDEX#7 |
| | | AREA_INDEX8 | SHORT | REGIONAL REPRESENTATIVE INDEX#8 |
| | | AREA_INDEX9 | SHORT | REGIONAL REPRESENTATIVE INDEX#9 |
| | | AREA_INDEX10 | SHORT | REGIONAL REPRESENTATIVE INDEX#10 |
| for(i=0;i<=NUM_OF_INDEX;i++) | | | | |
| | INDEX | INDEX_ID | SHORT | ID UNIQUELY SPECIFIED IN DATA |
| | | NORTH_INDEX_ID | SHORT | INDEX ASSOCIATED WITH PHOTOGRAPHIC POINT LOCATED AT SHORTEST DISTANCE IN NORTH DIRECTION |
| | | SOUTH_INDEX_ID | SHORT | INDEX ASSOCIATED WITH PHOTOGRAPHIC POINT LOCATED AT SHORTEST DISTANCE IN SOUTH DIRECTION |
| | | EAST_INDEX_ID | SHORT | INDEX ASSOCIATED WITH PHOTOGRAPHIC POINT LOCATED AT SHORTEST DISTANCE IN EAST DIRECTION |
| | | WEST_INDEX_ID | SHORT | INDEX ASSOCIATED WITH PHOTOGRAPHIC POINT LOCATED AT SHORTEST DISTANCE IN WEST DIRECTION |
| | | LATITUDE_REF | ASCII | NORTH LATITUDE, SOUTH LATITUDE |
| | | LATITUDE | RATIONAL | LATITUDE |
| | | LONGITUDE_REF | ASCII | EAST LONGITUDE, WEST LONGITUDE |
| | | LONGITUDE | RATIONAL | LONGITUDE |
| | | DIRECTION | RATIONAL | PHOTOGRAPHIC AZIMUTH |
| | | TIME_STAMP | RATIONAL | TIME INSTANT |
| | | DATA_STAMP | RATIONAL | DATE |
| | | GENRE | SHORT | GENRE |
| | | RECOMMEND_LEVEL | SHORT | DEGREE OF RECOMMENDATION |
| | | REC_MODE | SHORT | PHOTOGRAPHY MODE |
| | | EXPOSURE_TIME | RATIONAL | EXPOSURE TIME |
| | | FNUMBER | RATIONAL | F-NUMBER |
| | | EXPOSURE_PROGRAM | SHORT | EXPOSURE PROGRAM |
| | | ISO_SPEED_RATINGS | SHORT | ISO SPEED |
| | | SHUTTER_SPEED_VALUE | SRATIONAL | SHUTTER SPEED |
| | | APERTURE_VALUE | RATIONAL | APERTURE VALUE |
| | | EXPOSURE_BIAS_VALUE | SRATIONAL | EXPOSURE CORRECTION VALUE |
| | | LIGHT_SOURCE | SHORT | TYPE OF LIGHT SOURCE |
| | | FLASH | SHORT | FLASH LAMP |
| | | FLASH_ENERGY | RATIONAL | FLASHLIGHT INTENSITY |
| | | EXPOSURE_MODE | SHORT | EXPOSURE MODE |
| | | WHITE_BALANCE | SHORT | WIGHT BALANCE MODE |
| | | SUBJECTDISTANCE | SHORT | DISTANCE TO SUBJECT |
| | | SUBJECTAREA | SHORT | SUBJECT REGION |
| | | SCENECAPTURETYPE | SHORT | TYPE OF PHOTOGRAPHIC SCENE |
| | | USER_COMMENT | ASCII | COMMENT |

RELATIVE POSITIONS OF PHOTOGRAPHIC POINT

SAMPLING REGIONAL REPRESENTATIVE INDICES

RETRIEVING INDEX ASSOCIATED WITH CURRENT POSITION

EXAMPLE OF DISPLAY PRESENTED WHEN CAMERA SETTINGS HAVE BEEN CHANGED

EXAMPLE OF DISPLAY PRESENTED WHEN CAMERA SETTINGS HAVE NOT BEEN CHANGED

PHOTOGRAPHY PROMPTING PROCESSING PROCEDURE (2)

EXAMPLE OF DISPLAY FOR PROMPTING PHOTOGRAPHY

EXAMPLE OF DISPLAY FOR PROMPTING USER TO SELECT WHETHER MODE IS CHANGED TO AUTONOMOUS PHOTOGRAPHY MODE

EXAMPLE OF DISPLAY FOR PROMPTING USER TO HOLD ORIENTATION OF DSC

EXAMPLE OF DISPLAY FOR PROMPTING USER TO CHANGE ORIENTATION OF DSC TO RIGHT

EXAMPLE OF DISPLAY FOR PROMPTING USER TO CHANGE ORIENTATION OF DSC TO LEFT

EXAMPLE OF DISPLAY FOR PROMPTING USER TO SELECT WHETHER CAMERA SETTING IS CHANGED TO RECOMMENDED CAMERA SETTING

IMAGING EQUIPMENT, PHOTOGRAPHIC SETTING DETERMINATION METHOD, AND PHOTOGRAPHIC SETTING DETERMINATION PROGRAM

CROSS-REFERENCE TO RELATED APPLICATION

The present application claims priority from Japanese Patent Application No. JP 2009-103144 filed in the Japanese Patent Office on Apr. 21, 2009, the entire content of which is incorporated herein by reference.

BACKGROUND OF THE INVENTION

1. Field of the Invention

The present invention relates to imaging equipment, a photographic setting determination method, and a photographic setting determination program. For example, the present invention is preferably adapted to a digital still camera that autonomously determines a photographic setting.

2. Description of the Related Art

In recent years, a digital still camera that autonomously determines a photographic setting according to the conditions in a place of photography (for example, brightness, a distance to a subject, and a type of light source) has been placed on the market as imaging equipment. What is referred to as the photographic setting is a setting relating to photography, for example, a camera setting defined with an exposure time, a focal length, and others. Herein, the digital still camera may be abbreviated to the DSC.

This type of DSC decides the conditions in a place of photography by analyzing an output of a camera sensor such as a distance sensor or an acceleration sensor and a taken image.

However, the conditions in a place of photography the DSC can decide are rough ones. A photographic setting suitable for the place of photography may not be said to be determined without fail.

A system in which the DSC obtains a current position by utilizing a global positioning system (GPS), and acquires setting information, which represents a photographic setting suitable for photography at the position (place), from a server over a network has been proposed (refer to, for example, JP-A-2003-348519 (Patent Document 1)).

SUMMARY OF THE INVENTION

According to the system, the DSC acquires setting information, which represents a photographic setting suitable for a place of photography, from a server over a network at a time of photography, and can thus determine the photographic setting suitable for the place. However, the system makes it necessary to enable the DSC and server to communicate with each other all the time. In a place where the DSC and server fail to communicate with each other, the DSC is not provided with setting information suitable for the place.

As mentioned above, the imaging equipment in accordance with the related art may not be said to be able to perform photography in a photographic setting suitable for a place of photography without fail.

The present invention addresses the foregoing problem. There is a need for imaging equipment capable of performing photography in a photographic setting suitable for a place of photography more reliably than the imaging equipment in accordance with the related art, a photographic setting determination method, and a photographic setting determination program.

According to an embodiment of the present invention, there is provided imaging equipment including a position acquisition unit that acquires a current position, a memory unit in which plural pieces of setting information that represent photographic settings suitable for photography at different positions and that are associated in advance with the positions are stored, a control unit that reads setting information, which represents a photographic setting suitable for photography at the current position acquired by the position acquisition unit, from the memory unit, and determines a photographic setting on the basis of the setting information, and an imaging unit that images a subject in the photographic setting determined by the control unit.

As mentioned above, the pieces of setting information suitable for photography at different positions are stored in advance in the memory unit. Therefore, once a current position is acquired, whether the position lies in a place where the imaging equipment fails to communicate with external equipment, photography can be achieved in a photographic setting suitable for the position (that is, the place of photography).

According to the embodiment of the present invention, since the pieces of setting information suitable for photography at different positions are stored in advance in the memory unit, once a current position is acquired, whether the position lies in a place where the imaging equipment fails to communicate with external equipment, photography can be achieved in a photographic setting suitable for the position (that is, the place of photography). Eventually, imaging equipment capable of achieving photography suitably for a place of photography more reliably than the imaging equipment in accordance with the related art, a photographic setting determination method, and a photographic setting determination program can be realized.

BRIEF DESCRIPTION OF THE DRAWINGS

FIG. 1 is a schematic diagram showing the appearance of a digital still camera (DSC);

FIG. 3 is a schematic diagram showing the structure of an automatic setting file;

DESCRIPTION OF THE PREFERRED EMBODIMENTS

Figure 2:
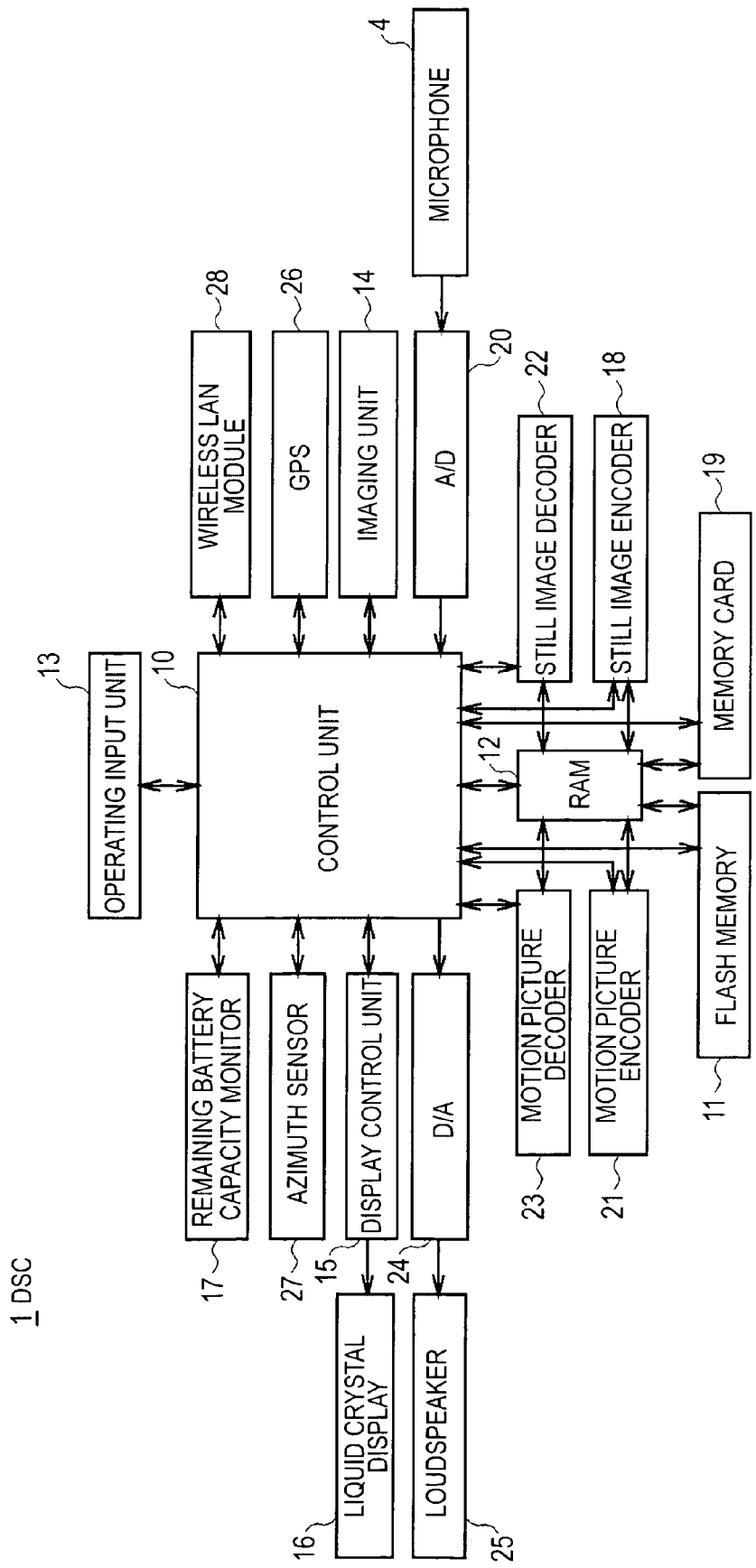
FIG. 2 is a block diagram showing the hardware configuration of the DSC.

The best modes for carrying out the present invention (hereinafter, embodiments) will be described below. A description will proceed by sequentially following the subjects listed below.
1. First embodiment
2. Second embodiment
3. Third embodiment
4. Variants

1. First Embodiment

[1-1. Appearance of a Digital Still Camera (DSC)]

(A) and (B) of FIG. 1 show the appearance of a digital still camera (DSC) serving as imaging equipment. The DSC 1 has a housing 2 shaped substantially like a flat parallelepiped whose size is small enough to be held by one hand. A lens 3 and a microphone 4 are disposed on the front side 2A of the housing 2.

On the top 2B of the housing 2, a shutter button 5 is disposed. On the flank 2C of the housing 2, a slot 6 for a memory card (not shown) is formed. On the back side 2D of the housing 2, a display device 7 is disposed. The display device 7 includes a liquid crystal display and a transparent touch panel covering the display surface of the liquid crystal display.

When set to a photography mode, the DSC 1 displays an image of a subject, which is taken through the lens 3, as a through image on the display device 7. The DSC 1 records the taken image responsively to a depressing manipulation performed on the shutter button 5.

The DSC 1 supports as major photography modes a still image mode in which a still image is taken and a motion picture mode in which a motion picture is taken.

More particularly, in the still image mode, when the shutter button 5 is depressed, the DSC 1 records a still image of a subject. In the motion picture mode, when the shutter button 5 is depressed, the DSC 1 initiates recording of a motion picture. When the shutter button 5 is depressed again, the recording of the motion picture is terminated. At this time, the DSC 1 records sounds, which are collected by the microphone 4, together with the motion picture.

Further, in a reproduction mode, the DSC 1 displays a recorded still image or motion picture on the display device 7. Along with the display of the motion picture, the DSC 1 outputs associated sounds through a built-in loudspeaker (not shown).

Further, the DSC 1 displays icons and buttons on the display device 7, and changes camera settings or switches the modes responsively to a touching manipulation performed on any of the icons and buttons.

[1-2. Hardware Configuration of the DSC]

Next, referring to FIG. 2, the hardware configuration of the DSC 1 will be described below. When a control unit 10 of the DSC 1 loads a program, which is written in a built-in flash memory 11, into a random-access memory (RAM) 12 and runs it, the components of the DSC 1 are controlled and various pieces of processing are executed.

More particularly, when instructed to switch a current operating mode to the photography mode via an operating input unit 13, the control unit 10 switches the operating mode to the photography mode. The operating input unit 13 includes the aforesaid shutter button 5 and a touch panel.

Under the control of the control unit 10, an imaging unit 14 uses an image sensor to convert light, which returns from a subject and enters via the lens 3, into an electric signal (that is, photoelectric conversion), and thus obtains an analog image signal. After converting the image signal into a digital image signal, the imaging unit 14 transmits the digital image signal to the control unit 10. The imaging unit 14 has the capability of a camera sensor (not shown) that discriminates brightness or a distance to a subject, and transmits an output, which is provided by serving as the camera sensor, to the control unit 10.

The control unit 10 transmits an image signal, which is sent from the imaging unit 14, to a display control unit 15. The display control unit 15 performs predetermined processing on the image signal and transmits the resultant signal to a liquid crystal display 16. As a result, the image of the subject is displayed as a through image on the liquid crystal display 16 (that is, the display device 7). Thus, the DSC 1 allows a photographer to check the subject.

At this time, the control unit 10 transmits a graphic signal, which represents icons, buttons, and information on a camera setting, and a reading of a remaining battery capacity, to the display control unit 15. The display control unit 15 superposes the graphic signal on an image signal sent from the imaging unit 14. As a result, the icons, buttons, information on a camera setting, and the reading of the remaining battery capacity are displayed together with a through image on the liquid crystal display 16. Incidentally, the remaining battery capacity is monitored by a remaining battery capacity monitor 17, and sent as remaining-battery capacity information from the remaining battery capacity monitor 17 to the control unit 10.

Assuming that the shutter button 5 of the operating input unit 13 is depressed halfway, the control unit 10 controls the imaging unit 14 to validate automatic focus. Thereafter, assuming that the shutter button 5 is fully depressed, if the still-image photography mode is designated, the control unit 10 records a still image.

Specifically, after temporarily storing an image signal for one frame, which is sent from the imaging unit 14, in the RAM 12, the control unit 10 sends the image signal to a still image encoder 18.

The still image encoder 18 compresses the image signal according to a predetermined still image format so as to produce still-image data. Herein, for example, a format recommended by the Joint Photographic Experts Group (JPEG) is adopted as the predetermined still image format.

The control unit 10 appends as appendant information tag information (which may be called Exif information), which is stipulated in the exchange-image-file format (Exif), to the still-image data, which is produced by the still image encoder 18, so as to produce a still-image file. As the Exif information, set values (parameters) defining a camera setting for photography are specified. After writing back the still-image file in the RAM 12, the control unit 10 records the still-image file in the flash memory 11 or a memory card 19. Thus, the DSC 1 records a still image.

In the motion picture photography mode, the control unit 10 initiates recording of a motion picture responsively to depression of the shutter button 5. Specifically, the control unit 10 temporarily stores an image signal sent from the imaging unit 14 and an audio signal, which is inputted through the microphone 4 via an analog-to-digital converter 20, in the RAM 12, and transmits the image signal to a motion picture encoder 21.

The motion picture encoder 21 compresses the image signal according to a predetermined motion picture format so as to produce motion-picture data. Herein, for example, the H.264 format is adopted as the predetermined motion picture format.

The control unit 10 compresses the audio signal, which is temporarily stored in the RAM 12, according to a predetermined audio format so as to produce audio data. The control unit 10 multiplexes the audio data and the motion-picture data produced by the motion picture encoder 21 so as to produce motion-picture audio data.

Further, the control unit 10 writes back the motion-picture audio data in the RAM 12, and then records the data in the flash memory 11 or memory card 19.

Thereafter, when the shutter button 5 is depressed again, the control unit 10 terminates recording of a motion picture. Specifically, the control unit 10 records motion-picture audio data, which remains in the RAM 12, in the flash memory 11 or memory card 19 so as to complete recording of a series of motion-picture audio data components that are produced during a period from initiation of photography to termination thereof. The control unit 10 appends appendant information to the motion-picture audio data, and records the data as a motion-picture audio file in the flash memory 11 or memory card 19. Thus, the DSC 1 records a motion picture.

When a manipulation of switching a mode to the reproduction mode is performed at the operating input unit 13, the control unit 10 switches the current mode to the reproduction mode. The control unit 10 then reads a designated file from the flash memory 11 or memory card 19, and temporarily stores the file in the RAM 12.

If the file is a still image file, the control unit samples still-image data from the still image file, and transmits the data to a still image decoder 22.

The still image decoder 22 decompresses the still-image data according to the still image format identical to that used for compression, and thus obtains an original image signal. The image signal is written back in the RAM 12.

The control unit 10 reads the image signal from the RAM 12 and transmits it to the display control unit 15. The display control unit 15 performs predetermined processing on the image signal and transmits the resultant signal to the liquid crystal display 16. As a result, a still image represented by the image signal is displayed on the liquid crystal display 16 (that is, display device 7). Thus, the DSC 1 reproduces a still image.

If the designated file is a motion-picture audio file, the control unit 10 separates motion-picture data and audio data from the motion-picture audio file, and transmits the motion-picture data to a motion picture decoder 23.

The motion picture decoder 23 decompresses the motion-picture data according to the motion picture format identical to that used for compression, and thus obtains an original image signal. The image signal is written back in the RAM 12.

The control unit 10 obtains an original audio signal by decompressing the audio data according to the audio format identical to that used for compression, and writes the signal back in the RAM 12.

The control unit 10 reads the image signal from the RAM 12, and transmits the signal to the display control unit 15. The control unit 10 reads the audio signal from the RAM 12, and transmits the signal to a digital-to-analog converter 24.

The display control unit 15 performs predetermined processing on the image signal, and transmits the resultant signal to the liquid crystal display 16. As a result, a motion picture represented by the image signal is displayed on the liquid crystal display 16 (that is, display device 7). At this time, since the audio signal is sent to the loudspeaker 25 via the digital-to-analog converter 24, sounds represented by the audio signal are outputted through the loudspeaker 25. Thus, the DSC 1 reproduces a motion picture and sounds.

Further, the DSC 1 includes a GPS module 26. The GPS module 26 receives signals from plural GPS satellites, and locates the current position of the DSC 1 regularly (for example, at intervals of 10 sec). Current positional information representing the current position (latitude, longitude) is transmitted from the GPS module 26 to the control unit 10.

Further, the DSC 1 includes an azimuth sensor 27. The azimuth sensor 27 detects geomagnetism, and obtains an azimuth regularly (for example, at intervals of 1 sec), to which the lens 3 of the DSC 1 is currently oriented (which may be called a current azimuth), on the basis of the geomagnetism. Current azimuthal information representing the current azimuth is transmitted from the azimuth sensor 27 to the control unit 10.

Further, the DSC 1 includes a wireless local area network (LAN) module 28. The control unit 10 is connected onto a predetermined network via the wireless LAN module 28, and transmits or receives various kinds of data items to or from pieces of equipment connected onto the network.

Owing to the foregoing hardware configuration, the DSC 1 has, in addition to the fundamental facilities for taking a still image and for reproducing the still image, the facilities for taking a motion picture and reproducing it, acquiring a current position and a current azimuth, and performing wireless communication.

Further, the DSC 1 has the facility for autonomously determining a camera setting suitable for photography at a current position (which may be called an autonomous setting facility). The autonomous setting facility will be described below.

[1-3. Autonomous Setting Facility]

In the flash memory 11 of the DSC 1, pieces of setting information representing camera settings suitable for photography in various places are stored in association with the places. The DSC 1 retrieves setting information, which is associated with a current position, from among the plural pieces of setting information stored in the flash memory 11, and uses the setting information to autonomously determine a camera setting suitable for the current position.

The pieces of setting information are produced by a manufacturer of the DSC or the like on the basis of camera settings employed when photographers have actually performed photography in various places (popular photographic points and recommended photographic points) in the past. The pieces of setting information are written in the flash memory 11 of the DSC 1 at a factory prior to delivery.

In reality, as shown in FIG. 3, an autonomous setting file 32 including plural pieces of setting information 30 associated with places and management information 31 for use in managing the plural pieces of setting information 30 is stored in advance in the flash memory 11 of the DSC 1. In other words, the autonomous setting file 32 is written in the flash memory 11 at a factory prior to delivery. Herein, the setting information 30 shall be called an index 30.

Each index 30 includes retrieval information 30A necessary to retrieve the index 30, photographic information 30B concerning an associated place, various set values 30C defining a camera setting suitable for photography in the place, and a comment 30D. The place associated with the index 30 is a photographic point at which the index 30 is used to autonomously determine a camera setting.

In the retrieval information 30A, an ID with which an index 30 is identified (which may be called an index ID), and the relative positions of the photographic point associated with the index 30 are specified. The relative positions are expressed with IDs of indices 30 associated with photographic points that lie closest to the photographic point associated with the index 30 in the north, south, west, and east directions respectively.

Figure 4:
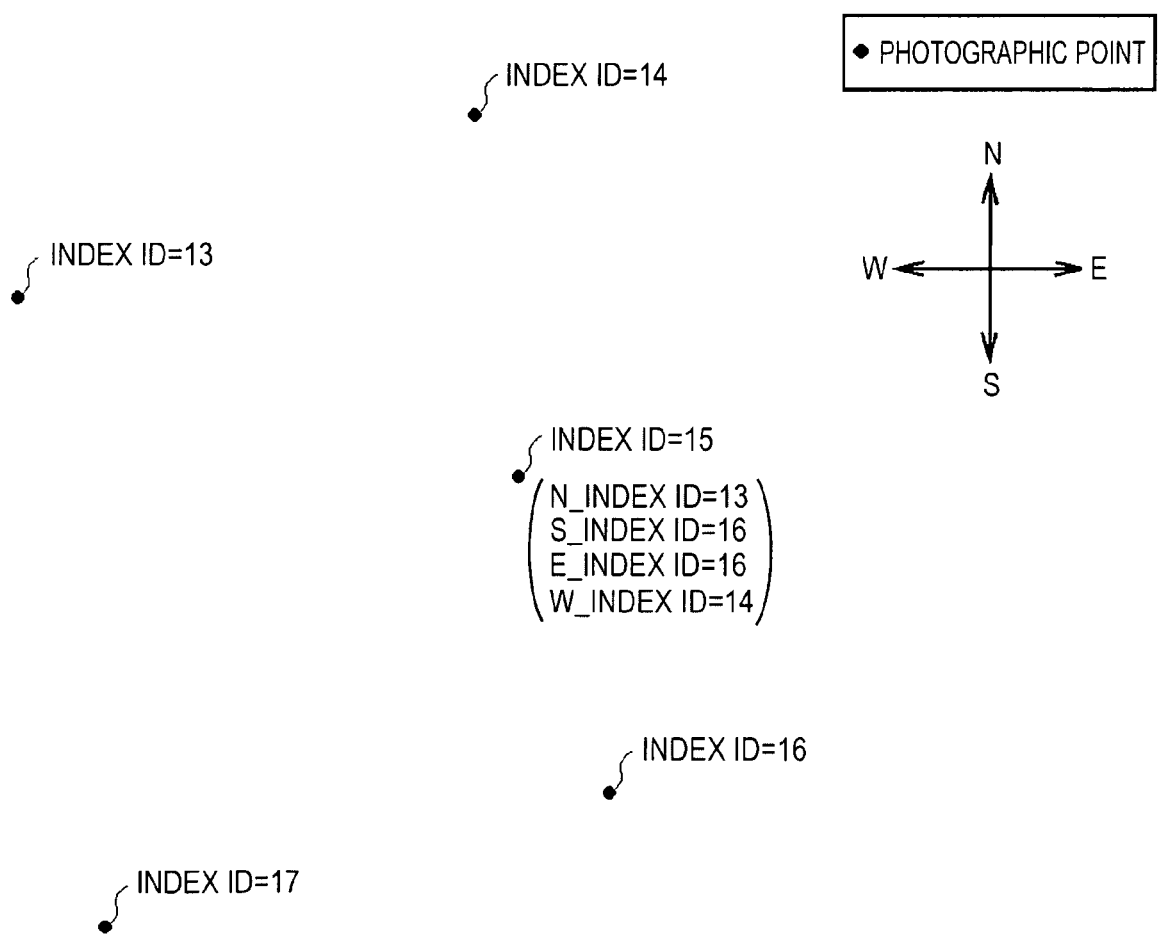
FIG. 4 is a schematic diagram showing the relative positions of a photographic point.

For example, as shown in FIG. 4, assume that the ID of an index 30 associated with a photographic point which lies closest to the photographic point associated with a certain index 30 (for example, ID=15) in the north direction is 13, and the ID of an index 30 associated with a photographic point which lies closest to the photographic point in the south direction is 16. Further, the ID of an index 30 associated with a photographic point which lies closest to the photographic point in the east direction shall be 16. The ID of an index 30 associated with a photographic point which lies closest to the photographic point in the west direction shall be 14.

In this case, the relative positions of the photographic point associated with the certain index 30 (ID=15) are expressed with the ID of 13 associated with the photographic point that lies closest in the north direction, the ID of 16 associated with the photographic point that lies closest in the south direction, the ID of 16 associated with the photographic point that lies closest in the east direction, and the ID of 14 associated with the photographic point that lies closest in the west direction. The IDs associated with the photographic points lying closest in the north, south, east, and west directions respectively may be specified as N_INDEXID, S_INDEXID, E_INDEXID, and W_INDEXID.

In the photographic information 30B, the north or south latitude, latitude, east or west longitude, and longitude indicating the absolute position of the photographic point associated with the index 30 are specified. In addition, a photographic azimuth suitable for photography at the photographic point (that is, an azimuth in which the camera should be oriented) is specified in the photographic information 30B. Further, a time instant suitable for photography at the photographic point (which may be called a recommended time) and a date (which may be called a recommended day) which are suitable for photography at the photographic point are specified in the photographic information 30B. The recommended time and recommended day may indicate a period, for example, from 8:00 to 10:00, in the morning, February and March, or all the year round.

Further, a genre of an image taken at the photographic point is specified in the photographic information 30B. Further, a degree of recommendation of the photographic point is specified in the photographic information 30B. The degree of recommendation is expressed with, for example, a numeral indicating any of five levels of 1 to 5. The larger the numeral is, the higher the degree of recommendation is. The degree of recommendation is determined in advance based on the popularity of the photographic point. Further, a photography mode (still-image photography mode or motion-picture photography mode) suitable for the photographic point is specified in the photographic information 30B.

Various set values defining a camera setting are set values defining a camera setting pieces and being specified as Exif information. More particularly, in the index 30, for example, set values indicating an exposure time, an f-number, an exposure program, an ISO speed, a shutter speed, and an aperture value are specified as the set values defining a camera setting. Further, set values indicating an exposure correction value, a type of light source, a flash lamp, a flashlight intensity, an exposure mode, a white balance (WB) mode, a distance to a subject, a subject region, and a type of photographic scene are specified in the index 30.

In the management information 31, a version of the autonomous setting file 32, the number of indices 30 registered in the autonomous setting file 32, and IDs of indices 30 that are associated with photographic points representative of regions and sampled from all the indices 30 are specified. The indices 30 associated with photographic points representative of regions may be called regional representative indices 30.

Figure 5:
FIG. 5 is a schematic diagram for use in explaining sampling of a regional representative index.

The regional representative indices 30 are, as shown in FIG. 5, indices 30 arbitrarily sampled in such a manner that an index is associated with one photographic point in each of regions (for example, ten regions) into which the Japanese archipelago is divided.

The control unit 10 of the DSC 1 retrieves an index 30 associated with a current position on the basis of the IDs of the regional representative indices 30 specified in the management information 31 and the relative positions and absolute position of a photographic point associated with each index 30. Retrieval of the index 30 associated with the current position will be concretely described below.

The control unit 10 first retrieves the ten regional representative indices 30 from among all the indices 30 on the basis of the IDs of the ten regional representative indices 30 specified in the management information 31 of the autonomous setting file 32.

Thereafter, the control unit 10 calculates distances of the current position (latitude, longitude), which is obtained by the GPS module 26, from the absolute positions (latitudes, longitudes) of the photographic points associated with the ten regional representative indices 30 resulting from the retrieval.

The control unit 10 identifies the regional representative index 30 associated with the photographic point located at the shortest distance, that is, the regional representative index 30 associated with the photographic point located closest to the current position.

Figure 6:
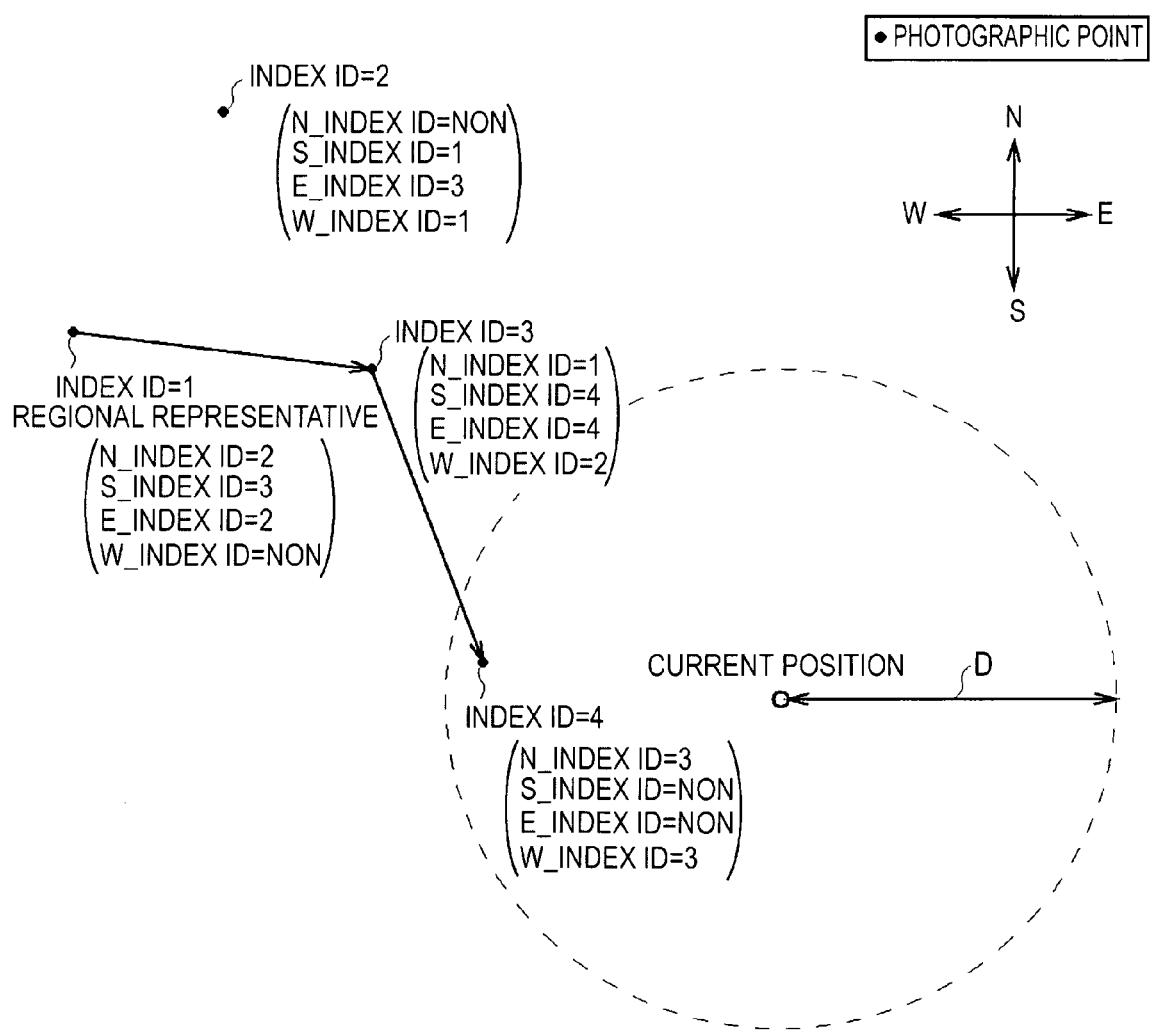
FIG. 6 is a schematic diagram for use in explaining retrieval of an index associated with a current position.

The control unit 10 regards the regional representative index 30 as a noted index 30, and retrieves the index 30 associated with a photographic point, which is located closer to the current position, with the photographic point associated with the noted index 30 as an origin. Specifically, as shown in FIG. 6, the control unit 10 first regards the regional representative index 30 (ID=1) as the noted index 30, and acquires the relative positions of the photographic point associated with the noted index 30.

The relative positions are expressed with IDs of indices 30 associated with photographic points that lie closest to the photographic point associated with the noted index 30 (ID=1) in the north, south, east, and west directions respectively. That is, the relative positions of the photographic point associated with the noted index 30 (ID=1) are expressed with the IDs of indices 30 associated with photographic points neighboring the photographic point associated with the noted index 30 (which may be called neighboring indices 30).

Now, assume that the ID of the index 30 associated with the photographic point located closest to the photographic point associated with the noted index 30 (ID=1) in the north direction is 2, the ID of the index associated with the photographic point located closest in the south direction is 3, the ID of the index associated with the photographic point located closest in the east direction is 2, and the ID of the index associated with the photographic point located closest in the west direction is none. When it says that the ID of the index associated with the photographic point located at the shortest distance in the west direction is none, it means that a photographic point associated with any index 30 does not exist (is not registered) within a predetermined range in the west direction from the photographic point associated with the noted index 30 (for example, within several kilometers).

At this time, the relative positions of the photographic point associated with the noted index 30 (ID=1) are specified as N_INDEXID=2, S_INDEXID=3, E_INDEXID=2, and W_INDEXID=NONE respectively.

Namely, the control unit 10 acquires the relative positions of the photographic point associated with the noted index 30 (ID=1), and thus obtains two IDs (IDs=2 and 3) as the IDs of indices 30 associated with the photographic points neighboring the photographic point associated with the noted index 30 (ID=1).

Based on the two thus obtained IDs, the control unit 10 retrieves the two indices 30 (that is, the indices 30 associated with the photographic points neighboring the photographic point associated with the noted index 30) from among all the indices 30.

The control unit 10 calculates the distances of the current position from the absolute positions of the photographic points associated with the two neighboring indices 30 resulting from the retrieval.

The control unit 10 identifies the index 30 associated with the photographic point that lies at the shortest distance from the current position among the photographic points associated with the neighboring indices 30 (that is, the index 30 associated with the photographic point which is located closest to the current position among the photographic points associated with the neighboring indices 30). The index 30 associated with the photographic point located closest to the current position may be called the shortest index 30.

Further, the control unit 10 decides whichever of the distance between the photographic point associated with the noted index 30 (ID=1) and the current position, and the distance between the photographic point associated with the shortest index 30 (for example, ID=3) out of the neighboring indices 30 and the current position is shorter.

Assume that the distance between the photographic point associated with the shortest index 30 out of the neighboring indices 30 and the current position is shorter than the distance between the photographic point associated with the noted index 30 (ID=1) and the current position. In this case, the control unit 10 regards the shortest index 30 (ID=3) as a new noted index 30.

The control unit 10 acquires the relative positions of the photographic point associated with the new noted index (ID=3). Assume that the relative positions of the photographic point associated with the new noted index 30 are specified as N_INDEXID=1, S_INDEXID=4, E_INDEXID=4, and W_INDEXID=2 respectively.

Namely, the control unit 10 shall obtain three IDs (IDs=1, 4, and 2) as the IDs of neighboring indices 30 associated with the photographic points neighboring the photographic point associated with the noted index 30.

Based on the thus obtained three IDs, the control unit 10 retrieves the three indices 30 (that is, the neighboring indices 30 associated with the photographic points neighboring the photographic point associated with the noted index 30) from among all the indices 30.

Further, the control unit 10 calculates the distances of the current position from the absolute positions of the photographic points associated with the three neighboring indices 30 resulting from the retrieval, and identifies the shortest index 30, which is associated with the photographic point located closest to the current position, from among the neighboring indices 30.

Further, the control unit 10 decides whichever of the distance between the photographic point associated with the noted index 30 (ID=3) and the current position, and the distance between the photographic point associated with the shortest index 30 (for example, ID=4) out of the neighboring indices 30 and the current position is shorter.

Assume that the distance between the photographic point associated with the shortest index 30 (ID=4) out of the neighboring indices 30 and the current position is shorter than the distance between the photographic point associated with the noted index 30 (ID=3) and the current position. In this case, the control unit 10 regards the shortest index 30 (ID=4) as a new noted index 30.

The control unit 10 then acquires the relative positions of the photographic point associated with the new noted index 30 (ID=4). Herein, the relative positions of the photographic point associated with the new noted index 30 shall be specified as N_INDEXID=3, S_INDEXID=NONE, E_INDEXID=NONE, and W_INDEXID=3 respectively.

Namely, the control unit 10 obtains one ID (ID=3) as the ID of a neighboring index 30 associated with a photographic point neighboring the photographic point associated with the noted index 30 (ID=4).

Herein, the distance of the photographic point, which is associated with the neighboring index 30 having the ID of 3, from the current position is longer than the distance of the photographic point associated with the noted index 30, which has the ID of 4, from the current position. Therefore, the control unit 10 decides that the noted index 30 (ID=4) is the shortest index 30, which is associated with the photographic point located closest to the current position, among all the indices 30.

Further, the control unit 10 decides whether the photographic point associated with the index 30 (ID=4) lies within a predetermined range D from the current position. The predetermined range D is designated as a range within which photography can be achieved in the same camera setting.

Specifically, if the photographic point associated with the index 30 lies within the predetermined range D from the current position, it means that the camera setting represented by the index 30 is a camera setting suitable for photography at the current position. In contrast, if the photographic point associated with the index 30 lies outside the predetermined range D, it means that the camera setting represented by the index 30 is not the camera setting suitable for photography at the current position.

Therefore, if the photographic point associated with the index 30 (ID=4) lies within the predetermined range D from the current position, the control unit 10 regards the index 30 (ID=4) as an index 30 associated with the current position.

If the photographic point associated with the index (ID=4) lies outside the predetermined range D from the current position, the index 30 (ID=4) is not regarded as the index 30 associated with the current position. At this time, the control unit 10 decides to have failed in finding the index 30 associated with the current position.

The control unit 10 thus retrieves the index 30 associated with the current position.

As described so far, the control unit 10 first regards the shortest index 30 out of the plural regional representative indices 30, which are specified in the management information 31, as a noted index 30.

Thereafter, the control unit 10 identifies the shortest index 30 from among the noted index 30 and the neighboring indices 30 associated with photographic points neighboring the photographic point associated with the noted index 30. The control unit 10 switches the noted index 30 into the shortest index 30 out of the neighboring indices 30, which are associated with photographic points neighboring the photographic point associated with the noted index 30, until the noted index 30 will correspond to the shortest index 30.

The control unit 10 regards the finally obtained shortest index 30 out of all the indices 30 (under the condition that the associated photographic point lies within the predetermined range D from the current position) as the index 30 associated with the current position.

The control unit 10 utilizes set values, which define a camera setting specified in the thus retrieved index 30 associated with the current position, so as to autonomously determine a camera setting suitable for photography at the current position. Based on the camera setting, the imaging unit 14 operates.

The control unit 10 may, like the one included in the related art, determine a camera setting on the basis of the conditions in a place of photography (brightness, a distance to a subject, or a type of light source) decided by analyzing outputs of camera sensors and a taken image. A user may manually determine part or the whole of the camera setting.

A camera setting to be determined by utilizing a prepared index 30 may be called a recommended camera setting. A camera setting to be determined based on the conditions in a place of photography, which are decided based on outputs of camera sensors and others, similarly to that to be determined according to the related art may be called a normal camera setting. A camera setting a user determines manually may be called a manual camera setting.

[1-4. Autonomous Setting Processing Procedure]

Figure 7:
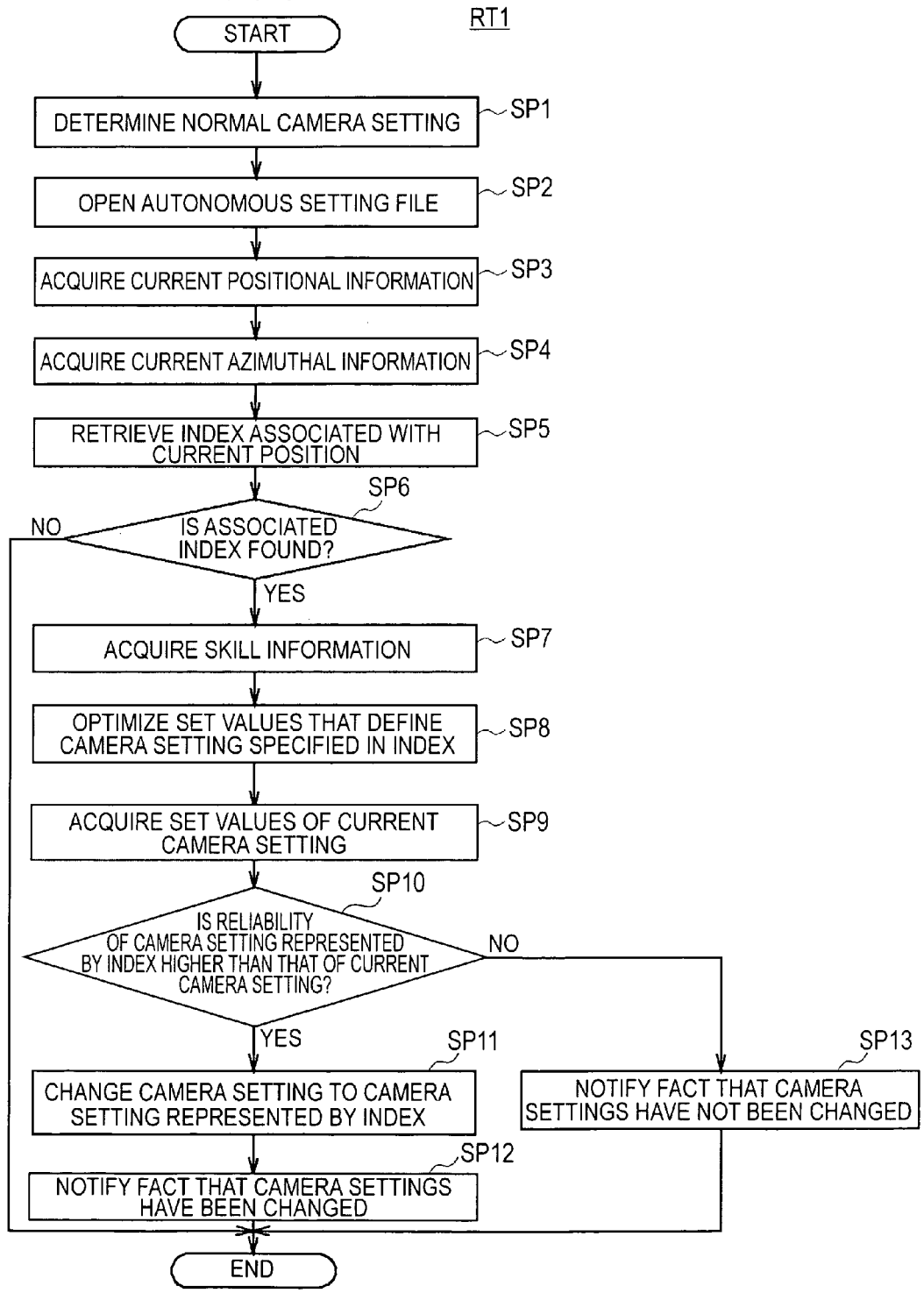
FIG. 7 is a flowchart describing an autonomous setting processing procedure.
Figure 8:
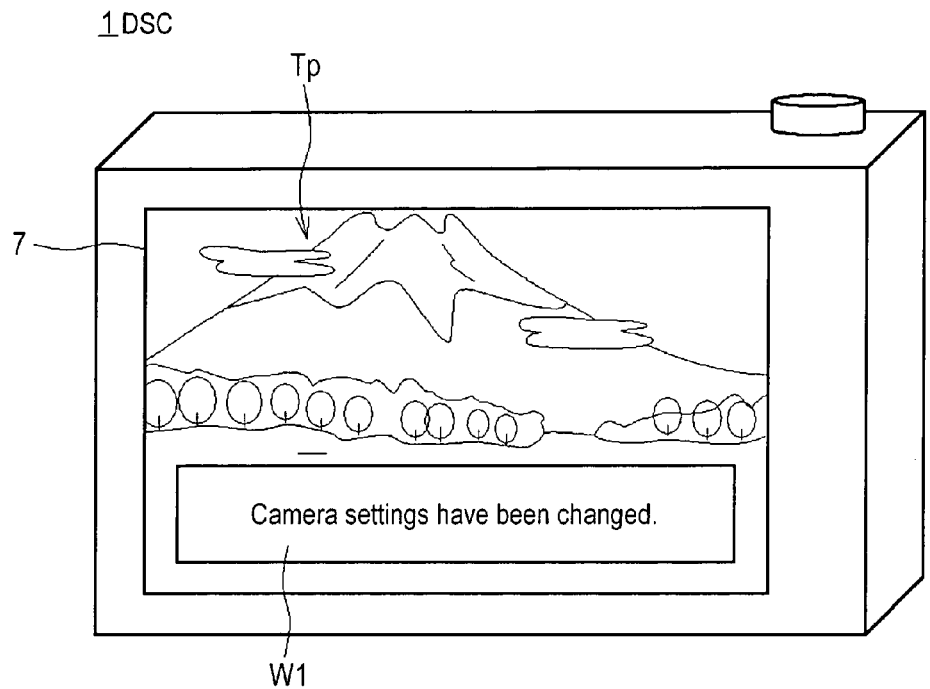
FIG. 8 is a schematic diagram showing an example of display presented when camera settings have been changed.
Figure 9:
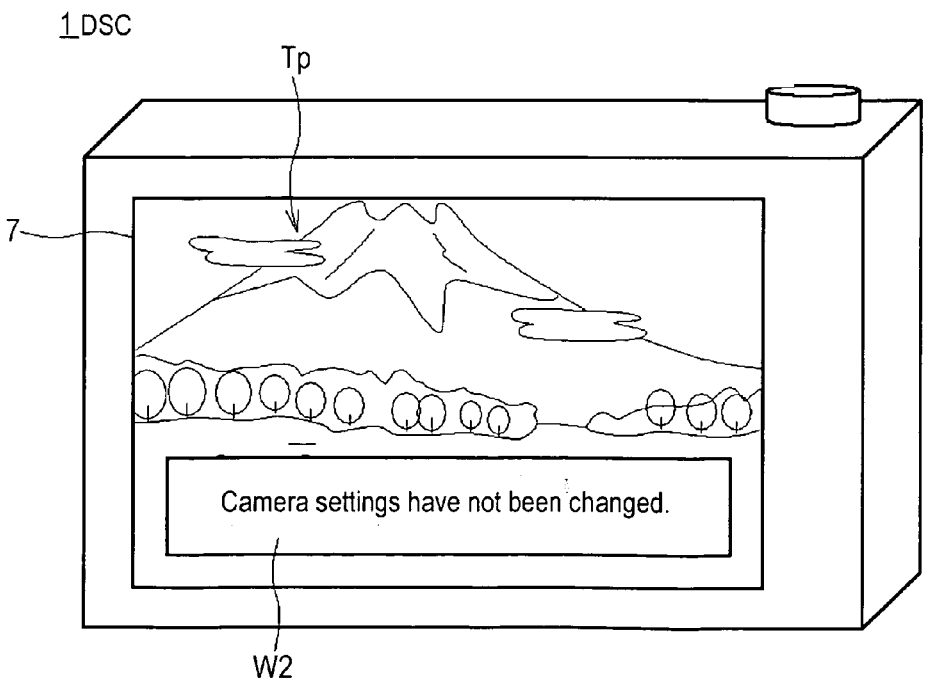
FIG. 9 is a schematic diagram showing an example of display presented when camera settings have not been changed.

Next, referring to the flowchart of FIG. 7, a processing procedure to be followed in order to autonomously determine a camera setting (which may be called an autonomous setting processing procedure) will be described below. The autonomous setting processing procedure RT1 is a processing procedure the control unit 10 of the DSC 1 executes according to a program written in the flash memory 11.

When instructed to switch a current mode to a photography mode by a user at the operating input unit 13, the control unit 10 switches the current mode to the photography mode, initiates the autonomous setting processing procedure RT1, and proceeds to step SP1.

At step SP1, the control unit 10 decides the current photographic conditions on the basis of outputs of camera sensors and a taken image, determines a normal camera setting on the basis of the decided conditions in a place of photography, and proceeds to step SP2.

At step SP2, the control unit 10 opens the autonomous setting file 32 written in the flash memory 11, and proceeds to step SP3.

At step SP3, the control unit 10 acquires current positional information representing a current position of the DSC 1 from the GPS module 26, and proceeds to step SP4. At step SP4, the control unit 10 acquires current azimuthal information representing a current azimuth, in which the lens 3 of the DSC 1 is oriented, from the azimuth sensor 27, and proceeds to step SP5.

At step SP5, the control unit 10 retrieves an index 30 associated with the current position, and proceeds to step SP6. The retrieval is performed as described previously. At step SP6, the control unit 10 decides whether the index 30 associated with the current position has been found.

When obtaining a negative result at step SP6 because the index 30 associated with the current position has not been found, the control unit 10 terminates the autonomous setting processing procedure RT1. In this case, the control unit 10 performs photography in a normal camera setting or a user's manual camera setting responsively to depression of the shutter button 5.

In contrast, when obtaining a positive result at step SP6 because the index 30 associated with the current position has been found, the control unit 10 proceeds to step SP7.

At step SP7, the control unit 10 reads skill information representing the skills (abilities) of the DSC 1 stored in advance in the flash memory 11, and proceeds to step SP8. In the skill information, for example, presence or absence of a flash lamp, a kind of exposure program, and an upper limit of ISO speeds are specified as the skills (abilities) of the DSC 1.

At step SP8, the control unit 10 optimizes the set values, which define a camera setting specified in the index associated with the current position, according to the abilities of the DSC 1.

More particularly, for example, assume that a value signifying "flashing" is specified as a set value for the flash lamp, which is one of set values defining a camera setting, in the index 30.

For example, assume that the DSC 1 is devoid of the flash lamp and "none" is specified for the flash lamp in the skill information. In this case, the control unit 10 changes the set value for the flash lamp specified in the index 30 from the value signifying "flashing" to a value signifying "non-flashing in line with the ability of the DSC 1."

For example, assume that a value signifying "shutter first" is specified as a set value for the exposure program, which is one of set values defining a camera setting, in the index 30.

For example, assume that the DSC 1 is devoid of an exposure program "shutter first" and "normal program" is specified as a kind of exposure program in the skill information. In this case, the control unit 10 changes, in line with the ability of the DSC 1, the set value for the exposure program specified in the index 30 from the value signifying "shutter first" to the value signifying "normal program."

For example, assume that 3200 is specified as a set value for the ISO speed, which is one of set values defining a camera setting, in the index 30.

For example, assume that the upper limit of ISO speeds supported by the DSC 1 is 1600 and 1600 is specified as the upper limit of ISO speeds in the skill information. In this case, the control unit 10 changes, in line with the ability of the DSC 1, the set value for the ISO speed specified in the index 30 from the value of 3200 to the upper limit of 1600.

As mentioned above, the control unit 10 optimizes the set values, which define a camera setting specified in the index 30 associated with the current position, according to the abilities of the DSC 1 (that is, adjusts the set values so that the set values will fall within a range of set values supported by the DSC 1), and proceeds to step SP9.

At step SP9, the control unit 10 acquires the set values defining a current camera setting (that is, a normal camera setting), and proceeds to step SP10.

At step SP10, the control unit 10 decides whether the camera setting defined with set values specified in the index 30 (recommended camera setting) has higher reliability than the current camera setting (normal camera setting) does.

More particularly, the control unit 10 compares, for example, a type of light source, which is one of the current photographic conditions decided at step SP1, with a type of light source indicated with a set value for the light source specified in the index 30.

Assume that the type of light source decided by the control unit 10 (a type for a fine day, a cloudy day, or a rainy day) is identical to the type of light source indicated with the set value for the light source specified in the index 30. In this case, the control unit 10 decides that the reliability of the set values defining the recommended camera setting and being specified in the index 30 is higher than that of the set values defining the current normal camera setting.

As a result, the control unit 10 obtains a positive result at step SP10, and proceeds to step SP11. At step SP11, the control unit 10 changes the camera settings from the normal camera setting to the recommended camera setting defined with the (optimized) set values specified in the index 30. Namely, the control unit 10 changes the set values defining the current normal camera setting into the (optimized) set values specified in the index 30. After thus changing the camera settings, the control unit 10 proceeds to step SP12.

At step SP12, the control unit 10 displays a child window W1, in which literal information signifying that a camera setting has been changed to the recommended camera setting is displayed, on the liquid crystal display 16 while superposing the child window on a through image Tp, and terminates the autonomous setting processing procedure RT1. In this case, the control unit 10 performs photography in the recommended camera setting responsively to depression of the shutter button 5.

Assume that the type of light source indicated in the normal camera setting is different from the type of light source indicated with the set value for the light source specified in the index 30. In this case, the control unit 10 decides that the reliability of the set values that define the camera setting represented by the index 30 is lower than that of the set values defining the current normal camera setting.

As a result, the control unit 10 obtains a negative result at step SP10, and proceeds to step SP13. At step SP13, the control unit 10 does not change camera settings (holds the normal camera setting), and displays a child window W2, in which literal information signifying that the camera settings have not been changed is displayed, on the liquid crystal display 16 while superposing the child window W2 on the through image Tp. The control unit 10 then terminates the autonomous setting processing procedure RT1. In this case, the control unit 10 performs photography in the normal camera setting or user's manual camera setting responsively to depression of the shutter button 5.

Owing to the autonomous setting processing procedure RT1, the DSC 1 autonomously determines a camera setting.

[1-5. Actions to be Performed in the First Embodiment, and Advantage to be Provided Thereby]

Owing to the foregoing constitution, indices 30 in each of which set values defining a camera setting suitable for photography at a photographic point are specified are stored in association with various photographic points in the flash memory 11 of the DSC 1.

The control unit 10 of the DSC 1 obtains a current position from the GPS module 26 at a time of photography, and retrieves an index 30, which is associated with the current position, from among all the indices 30 stored in the flash memory 11.

The control unit 10 autonomously determines a camera setting using the set values specified in the index 30 resulting from the retrieval.

As long as the DSC 1 lies in a place where the DSC 1 can acquire a current position, even if the DSC 1 fails to communicate with external equipment in the place, the DSC 1 can perform photography in a camera setting suitable for the place.

The control unit 10 selects as the first noted index the shortest index 30, which is associated with a photographic point located closest to the current position, from among the regional representative indices 30 sampled in relation to respective regions from among all indices 30. Further, the control unit 10 identifies the shortest index 30 from among the noted index 30 and the neighboring indices 30 associated with photographic points neighboring the photographic point associated with the noted index. The control unit 10 switches the noted index 30 into the shortest index 30 selected from among the neighboring indices 30, which are associated with photographic points neighboring the photographic point associated with the noted index 30, until the noted index 30 finally corresponds to the shortest index 30.

The control unit 10 recognizes the shortest index 30, which is finally selected from among all the indices 30 (under the condition that the photographic point associated with the shortest index 30 lies within the predetermined range from the current position), as the index 30 associated with the current position.

Thus, compared with a case where the distances of the current position from the photographic points associated with all the indices 30 are calculated in order to retrieve the shortest index 30 from among all the indices 30, the control unit 10 can largely shorten a retrieving time and determine a camera setting more quickly.

Further, the set values defining a camera setting and being specified in an index 30 are set values in conformity with tag information stipulated in the standard format Exif. The control unit 10 of the DSC 1 determines a camera setting after optimizing the set values, which are specified in an index 30 associated with a current position, according to the abilities of the DSC 1.

Therefore, the autonomous setting file 32 including the indices 30 and management information 31 can be shared by DSCs having different capabilities. Eventually, it is unnecessary to create the autonomous setting file 32 for each of the DSCs having different capabilities. Creation of the autonomous setting file 32 can be simplified.

Further, before determining a camera setting using set values specified in an index 30, the control unit 10 of the DSC 1 determines a camera setting on the basis of the conditions in a place of photography decided by analyzing outputs of camera sensors and a taken image.

For example, when an index 30 associated with a current position is not found, the control unit 10 determines a camera setting on the basis of the decided conditions in the place of photography.

In contrast, when the index 30 associated with the current position is found, the control unit 10 decides whichever of the camera setting defined with the set values specified in an index 30 and a current camera setting is suitable for photography at the current position.

More particularly, the control unit 10 decides whether the current photographic conditions decided by the DSC 1 (for example, the type of light source) correspond to the photographic conditions specified in the index 30 (for example, the type of light source).

If the photographic conditions correspond to each other, the control unit 10 decides that the camera setting defined with the set values specified in the index 30 is suitable for photography, and changes the current camera setting to the camera setting defined with the set values specified in the index 30.

In contrast, if the photographic conditions do not correspond to each other, the control unit 10 decides that the current camera setting is suitable for photography, and utilizes the current camera setting without any change.

Thus, the DSC 1 can perform photography in a camera setting more suitable for photography at the current position.

According to the foregoing constitution, as long as the DSC 1 lies in a place where the DSC 1 can acquire a current position, even if the DSC 1 fails to communicate with external equipment in the place, the DSC 1 can perform photography in a photographic setting suitable for the place. Eventually, the DSC 1 can perform photography in a manner suitable for the place of photography more reliably than that included in the related art can.

2. Second Embodiment

Next, the second embodiment will be described below. In the second embodiment, the DSC 1 acquires a current position at intervals of a predetermined time, and retrieves an index 30, which is associated with the current position, at intervals of the predetermined time. When the DSC 1 finds the index 30 associated with the current position, the DSC 1 prompts a user to perform photography at the current position.

Specifically, in the second embodiment, the photographic point registered in association with the index 30 is regarded as a recommended photographic point. When the DSC is, for example, carried by a user and moved to the recommended photographic point, the DSC 1 recommends the user to perform photography in the place.

The constitution of the DSC 1, and the method of retrieving an index 30 associated with a current position are identical to those of the first embodiment. For the constitution and the retrieving method, refer to the first embodiment. Herein, referring to FIG. 10 and FIG. 11, a procedure RT2 for processing of prompting photography at a photographic point registered in association with an index 30 (which may be called a photography prompting processing procedure) which is executed by the control unit 10 of the DSC 1 will be described below.

Figure 10:
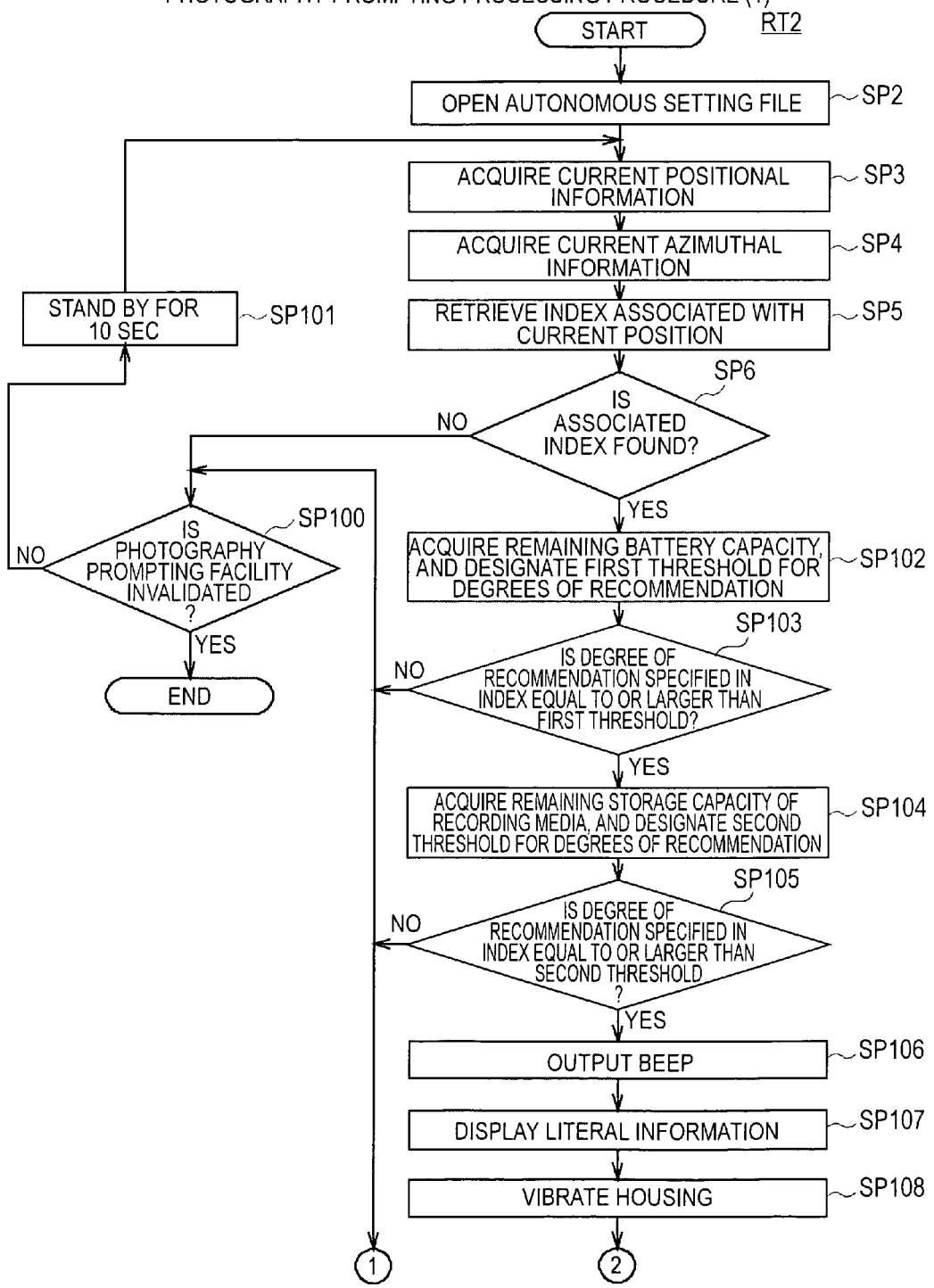
FIG. 10 is a flowchart describing a photography prompting processing procedure.
Figure 11:
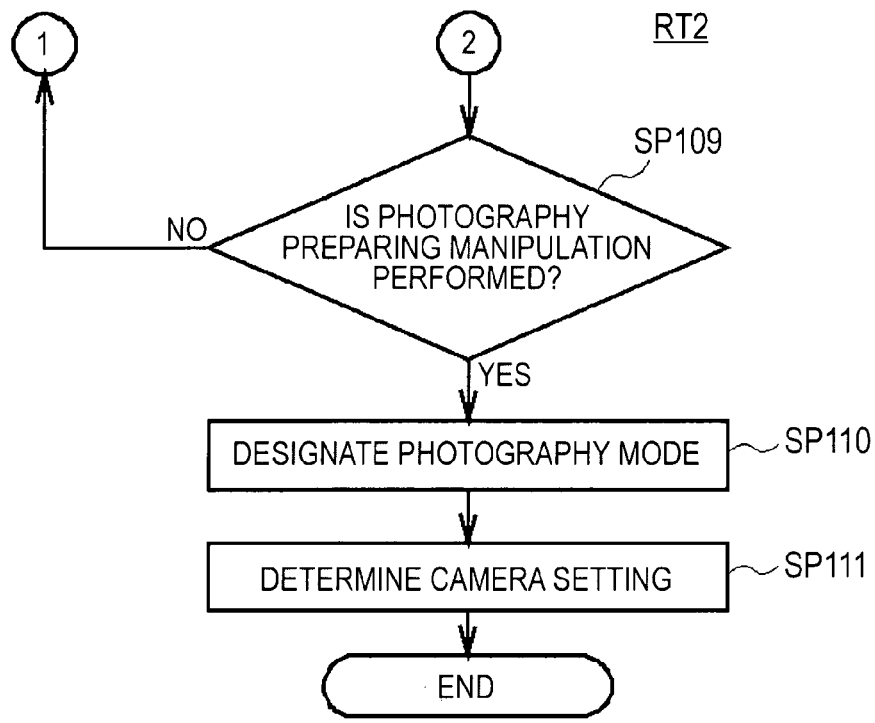
FIG. 11 is a flowchart describing a continuation of the photography prompting processing procedure mentioned in FIG. 10.

Among the steps of the photography prompting processing procedure RT2 shown in FIG. 10 and FIG. 11, steps having the same contents as those of the autonomous setting processing procedure RT1 implemented in the first embodiment will bear the same reference numerals.

[2-1. Photography Prompting Processing Procedure]

When instructed to validate a facility, which prompts photography at a photographic point registered in association with an index 30 (which may be called a photography prompting facility), by a user at the operating input unit 13, the control unit 10 initiates the photography prompting processing procedure RT2.

At step SP2, the control unit 10 opens the autonomous setting file 32 written in the flash memory 11, and proceeds to step SP3.

At step SP3, the control unit 10 acquires current positional information representing the current position of the DSC 1 from the GPS module 26, and proceeds to step SP4. At step SP4, the control unit 10 acquires current azimuthal information representing an azimuth (current azimuth), in which the lens 3 of the DSC 1 is currently oriented, from the azimuth sensor 27, and proceeds to step SP5.

At step SP5, the control unit 10 retrieves the index 30 associated with the current position, and proceeds to step SP6. At step SP6, the control unit 10 decides whether the index 30 associated with the current position has been found as a result of retrieval.

If the control unit 10 obtains a negative result at step SP6 because the index 30 associated with the current position has not been found (that is, the current position is not a recommended photographic point), the control unit 10 proceeds to step SP100. At step SP100, the control unit 10 decides whether the user has instructed to invalidate the photography prompting facility at the operating input unit 13.

When obtaining a positive result at step SP100 because the control unit 10 is instructed to invalidate the photography prompting facility, the control unit 10 terminates the photography prompting processing procedure RT2.

In contrast, when obtaining a negative result at step SP100 because the control unit is not instructed to invalidate the photography prompting facility, the control unit 10 proceeds to step SP101. At step SP101, the control unit 10 stands by for, for example, 10 sec, then returns to step SP3, and acquires current positional information again.

When obtaining a positive result at step SP6 because the index 30 associated with the current position has been found (that is, the current position is a recommended photographic point), the control unit 10 proceeds to step SP102.

At step SP102, the control unit 10 acquires remaining-battery capacity information representing the remaining battery capacity of the DSC 1 from the remaining battery capacity monitor 17. Based on the remaining battery capacity represented by the remaining-battery capacity information, the control unit 10 designates a first threshold for the degrees of recommendation specified in indices 30.

More particularly, if the remaining battery capacity is, for example, 50% or more, the control unit 10 sets the first threshold for the degrees of recommendation to 1. If the remaining battery capacity falls below 50%, the first threshold for the degrees of recommendation is set to 3. The control unit 10 recognizes as a first condition for prompting photography at a current position the fact that the degree of recommendation specified in an index 30 is equal to or larger than the thus designated first threshold.

Specifically, the first condition is a condition under which: when the remaining battery capacity is small, photography is prompted only at photographic points having high degrees of recommendation assigned thereto; and when the remaining battery capacity is large, photography is prompted at as many photographic points as possible.

After determining the first condition as mentioned above, the control unit 10 proceeds to step SP103.

At step SP103, the control unit 10 decides whether the degree of recommendation specified in the index 30 associated with the current position satisfies the first condition, that is, whether the degree of recommendation is equal to or larger than the first threshold designated based on the remaining battery capacity.

Assume that the control unit 10 obtains a negative result at step SP103 because the degree of recommendation specified in the index 30 associated with the current position does not satisfy the first condition. In this case, the control unit 10 does not prompt photography at the current position, but returns to step SP100, and decides whether a manipulation has been performed to invalidate the photography prompting facility.

In contrast, when obtaining a positive result at step SP103 because the degree of recommendation specified in the index 30 associated with the current position satisfies the first condition, the control unit 10 proceeds to step SP104.

At step SP104, the control unit 10 acquires the remaining storage capacity offered by the flash memory 11 and memory card 19 (which may be comprehensively called the recording medium). Based on the acquired remaining storage capacity of the recording medium, the control unit 10 designates a second threshold for the degrees of recommendation specified in the indices 30.

More particularly, for example, if the remaining storage capacity is equal to or larger than 30%, the control unit 10 sets the second threshold for the degrees of recommendation to 1. If the remaining storage capacity falls below 30%, the control unit 10 sets the second threshold for the degrees of recommendation to 5. The control unit 10 recognizes as a second condition for prompting photography at the current position the fact that the degree of recommendation specified in an index 30 is equal to or larger than the thus designated second threshold.

Specifically, the second condition is a condition under which: when the remaining storage capacity of the recording medium is small, photography is prompted only at photographic points having high degrees of recommendation assigned thereto; and when the remaining storage capacity is large, photography is prompted at as many photographic points as possible.

As mentioned above, after designating the second condition, the control unit 10 proceeds to step SP105.

At step SP105, the control unit 10 decides whether the degree of recommendation specified in the index 30 associated with the current position satisfies the second condition, that is, the degree of recommendation is equal to or larger than the second threshold designated based on the remaining storage capacity of the recording medium.

Assume that the control unit 10 obtains a negative result at step SP105 because the degree of recommendation specified in the index 30 associated with the current position does not satisfy the second condition. In this case, the control unit 10 does not prompt photography at the current position, but returns to the step SP100, and decides whether a manipulation has been performed to invalidate the photography prompting facility.

In contrast, if the control unit 10 obtains a positive result at step SP105 because the degree of recommendation specified in the index 30 associated with the current position satisfies the second condition, the control unit 10 proceeds to step SP106.

At step SP106, the control unit 10 outputs a beep through the loudspeaker 25 so as to prompt photography at the current position, and proceeds to step SP107.

Figure 12:
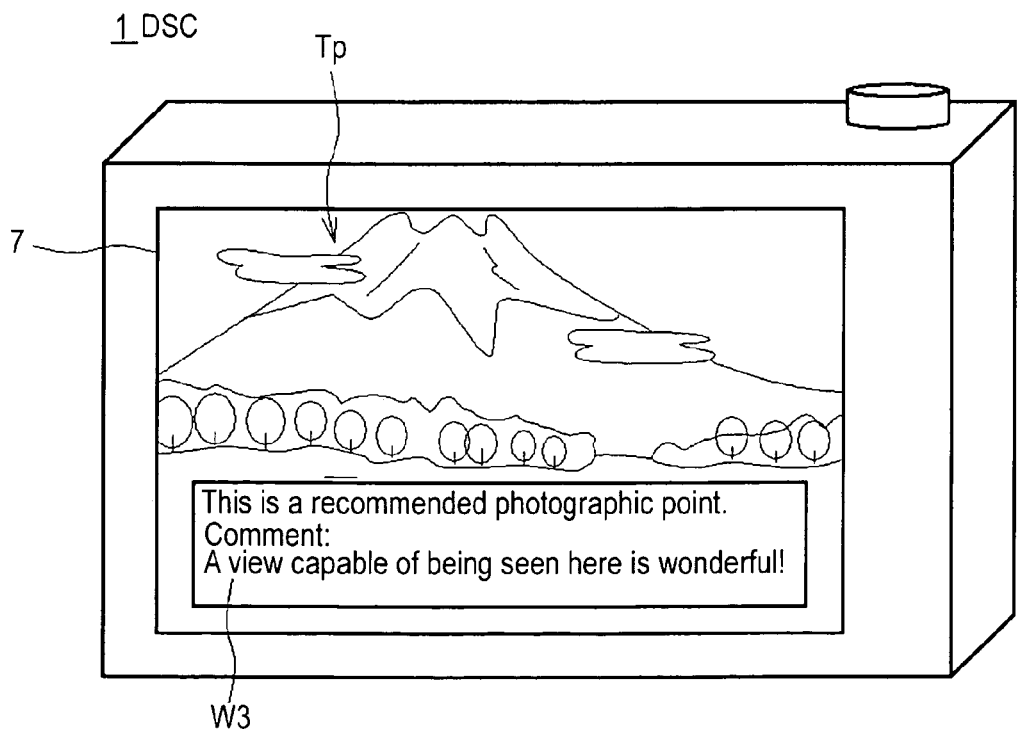
FIG. 12 is a flowchart showing an example of display presented in order to prompt photography.

At step SP107, the control unit 10 displays, as shown in FIG. 12, a child window W3, in which literal information signifying that the current position is a recommended photographic point is displayed, on the liquid crystal display 16 while superposing the child window W3 on a through image TP, and thus prompts photography at the current position. The control unit 10 then proceeds to step SP108. If a comment 30D is specified in the index 30 associated with the current position, the comment 30D may be displayed in the child window W3 together with the literal information. The degree of recommendation may be displayed together with the comment and literal information.

At step SP108, the control unit 10 starts a vibration motor (not shown) so as to vibrate the housing 2 for the purpose of prompting photography at the current position, and then proceeds to step SP109.

As mentioned above, the control unit 10 outputs a beep, displays literal information, and vibrates the housing so as to prompt a user to perform photography at the current position.

At step SP109, the control unit 10 decides whether a photography preparing manipulation (depressing the shutter button 5 halfway) has been performed at the operating input unit 13.

When obtaining a negative result at step SP109 because the photography preparing manipulation has not been performed, the control unit 10 returns to step SP100, and decides whether a manipulation has been performed to invalidate the photography prompting facility.

In contrast, when obtaining a positive result at step SP109 because the photography preparing manipulation has been performed, the control unit 10 proceeds to step SP110.

At step SP110, the control unit 10 sets the photography mode of the DSC 1 to the still-image photography mode or motion-picture photography mode according to the photography mode specified in the index 30 associated with the current position, and proceeds to step SP111.

At step SP111, the control unit 10 optimizes the set values, which are specified in the index 30 associated with the current position, according to the abilities of the DSC 1, determines a camera setting on the basis of the optimized set values, and then terminates the photography prompting processing procedure RT2. Thereafter, the control unit 10 performs photography responsively to depression of the shutter button 5.

Owing to the photography prompting processing procedure RT2, when the current position is a photographic point registered in association with an index 30, the DSC 1 autonomously prompts photography.

[2-2. Actions to be Performed in the Second Embodiment, and Advantage to be Provided Thereby]

As mentioned above, the control unit 10 of the DSC 1 acquires a current position at intervals of a predetermined time, and retrieves an index 30, which is associated with the current position, at intervals of the predetermined time.

As a result, when finding an index 30 associated with a current position, the control unit 10 notifies a user of the fact that the current position is a recommended photographic point, and prompts the user to perform photography at the current position.

When the user performs a photography preparing manipulation, the control unit 10 utilizes the set values, which are specified in the index 30 associated with the current position, so as to autonomously determine a camera setting suitable for photography at the current position.

As mentioned above, even if a user does not know any popular photographic point or recommended photographic point, the DSC 1 does not miss performing photography at the photographic point, but can perform photography in a camera setting suitable for the photographic point.

The control unit 10 of the DSC 1 decides based on a remaining battery capacity or the remaining storage capacity of the recording medium whether photography is prompted at a current position (that is, at a recommended photographic point).

Accordingly, the DSC 1 can avoid such an incident that, for example, although the remaining battery capacity or the remaining storage capacity of the recording medium is small, since photography is prompted at a current position, a user fails to perform photography in a place in which the user is originally intended to perform photography.

3. Third Embodiment

Next, the third embodiment will be described below. In the third embodiment, when the DSC 1 finds an index 30 associated with a current position, after the DSC 1 determines a camera setting according to the set values specified in the index 30, the DSC 1 autonomously performs photography.

Specifically, in the third embodiment, the DSC 1 autonomously determines a camera setting and performs photography.

The constitution of the DSC 1 and the method of retrieving an index 30 associated with a current position are identical to those in the first embodiment. For the constitution and method, refer to the first embodiment. Herein, referring to FIG. 13, only a procedure RT3 for autonomous photographing processing to be executed by the control unit 10 of the DSC 1 (which may be called an autonomous photographing processing procedure) will be described below.

Figure 13:
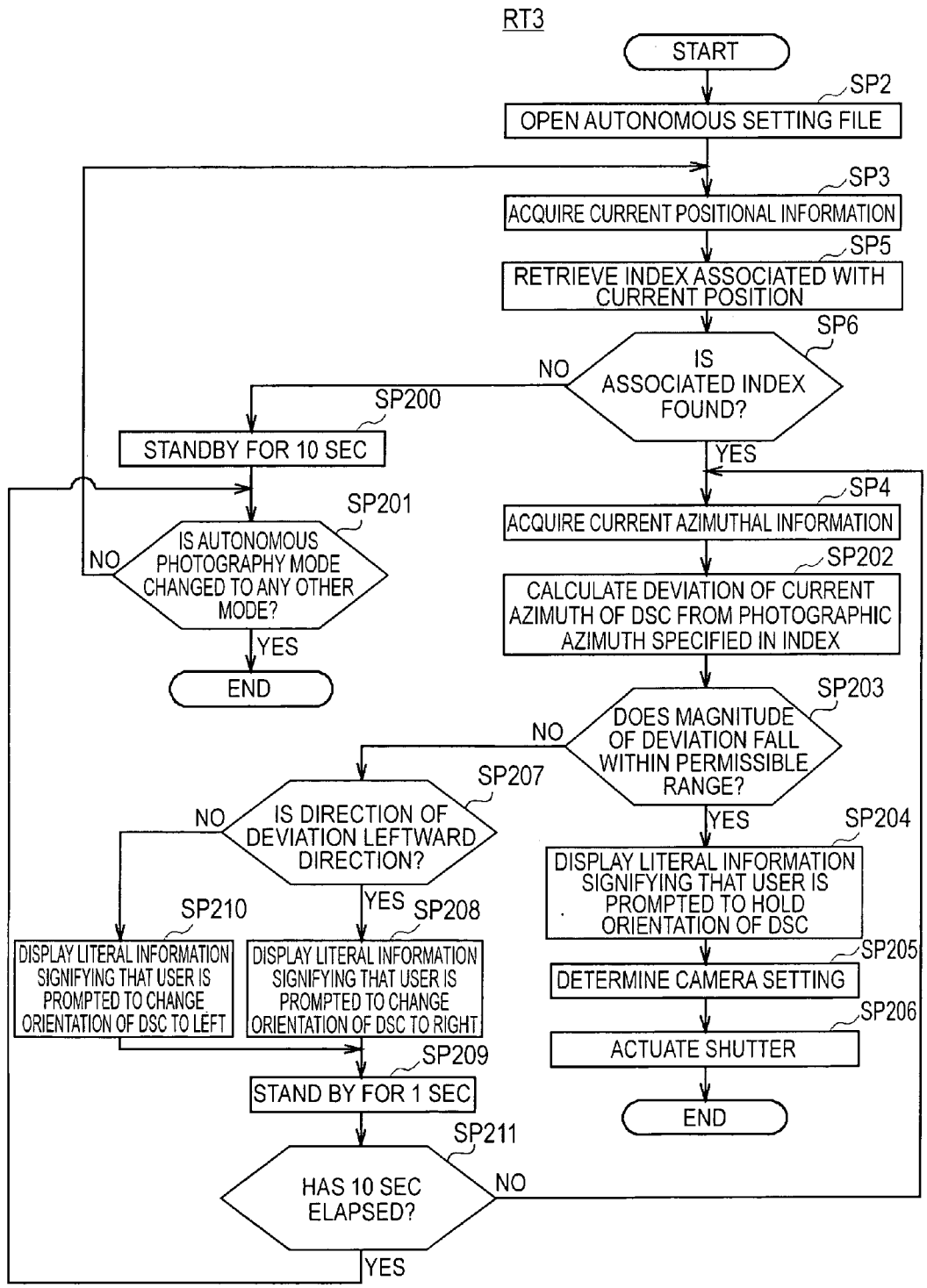
FIG. 13 is a flowchart describing an autonomous photographing processing procedure.

Among the steps of the autonomous photographing processing procedure RT3 shown in FIG. 13, steps having the same contents as those of the autonomous setting processing procedure RT1 implemented in the first embodiment are assigned the same reference numerals.

[3-1. Autonomous Photographing Processing Procedure]

When instructed to switch a photography mode to a mode, in which photography is performed autonomously (which is called an autonomous photography mode), by a user at the operating input unit 13, the control unit 10 switches the mode to the autonomous photography mode, initiates the autonomous photographing processing procedure RT3, and proceeds to step SP2.

Figure 14:
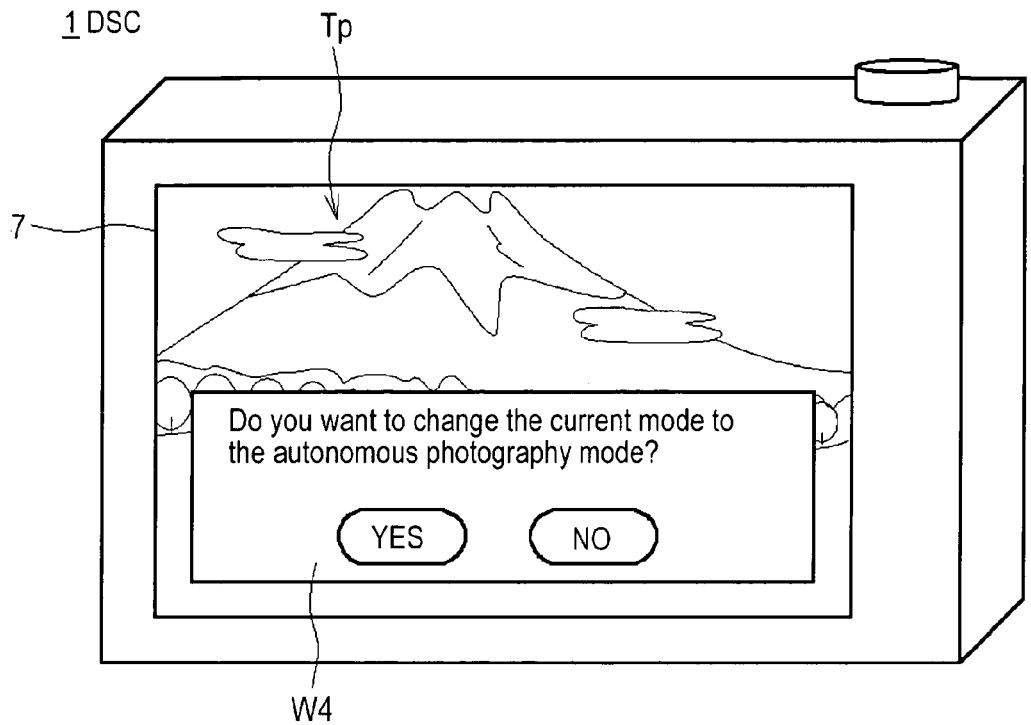
FIG. 14 is a schematic diagram showing an example of display presented in order to prompt a user to select whether a photography mode is switched to an autonomous photography mode.

Incidentally, when a predetermined manipulation is performed at the operating input unit 13, the control unit 10 displays, as shown in FIG. 14, a child window W4, in which two options are displayed so that whether the mode is switched to the autonomous photography mode can be selected, on the liquid crystal display 16. When the option for switching the mode to the autonomous photography mode is selected at the operating input unit 13, the control unit 10 recognizes that switching the mode to the autonomous photography mode has been instructed, and switches the mode to the autonomous photography mode.

At step SP2, the control unit 10 opens the autonomous setting file 32 written in the flash memory 11, and proceeds to step SP3.

At step SP3, the control unit 10 acquires current positional information, which represents the current position of the DSC 1, from the GPS module 26, and proceeds to step SP5. At step SP5, the control unit 10 retrieves an index 30 associated with the current position, and proceeds to step SP6. At step SP6, the control unit 10 decides whether the index 30 associated with the current position has been found as a result of retrieval.

When obtaining a negative result at step SP6 because the index 30 associated with the current position has not been found (that is, the current position is not a photographic point registered in association with an index 30), the control unit 10 proceeds to step SP200.

At step SP200, the control unit 10 stands by, for example, for ten sec, and then proceeds to step SP201. At step SP201, the control unit 10 decides whether switching from the autonomous photography mode to any other mode has been instructed at the operating input unit 13.

When obtaining a positive result at step SP201 because switching into any other mode has been instructed, the control unit 10 switches the modes from the autonomous photography mode to any other mode, and terminates the autonomous photographing processing procedure RT3.

In contrast, when obtaining a negative result at step SP201 because switching to any other mode has not been instructed, the control unit 10 returns to step SP3, and acquires current positional information again.

In contrast, when obtaining a positive result at step SP6 because the index 30 associated with the current position has been found (that is, the current position is a photographic point registered in association with an index 30), the control unit 10 proceeds to step SP4.

At step SP4, the control unit 10 acquires current azimuthal information, which represents an azimuth (current azimuth) in which the lens 3 of the DSC 1 is currently oriented, from the azimuth sensor 27, and proceeds to step SP202.

At step SP202, the control unit 10 calculates a magnitude of a deviation of a current azimuth, which is represented by azimuthal information, from a photographic azimuth specified in the index 30 associated with the current position, and the direction of the deviation, and proceeds to step SP203.

Herein, the magnitude of a deviation signifies to what extent the current azimuth of the DSC 1 is deviated from the photographic azimuth specified in the index 30 (that is, the photographic azimuth suitable for photography at the current position). The direction of the deviation signifies to which of the right and left the current azimuth of the DSC 1 is deviated from the photographic azimuth specified in the index 30.

At step SP203, the control unit 10 decides whether the magnitude of the deviation falls within a permissible range (for example, 10° or less to the right or left).

When obtaining a positive result at step SP203 because the magnitude of the deviation falls within the permissible range, that is, the current azimuth of the DSC 1 corresponds to or nearly corresponds to the photographic azimuth specified in the index 30, the control unit 10 proceeds to step SP204.

Figure 15:
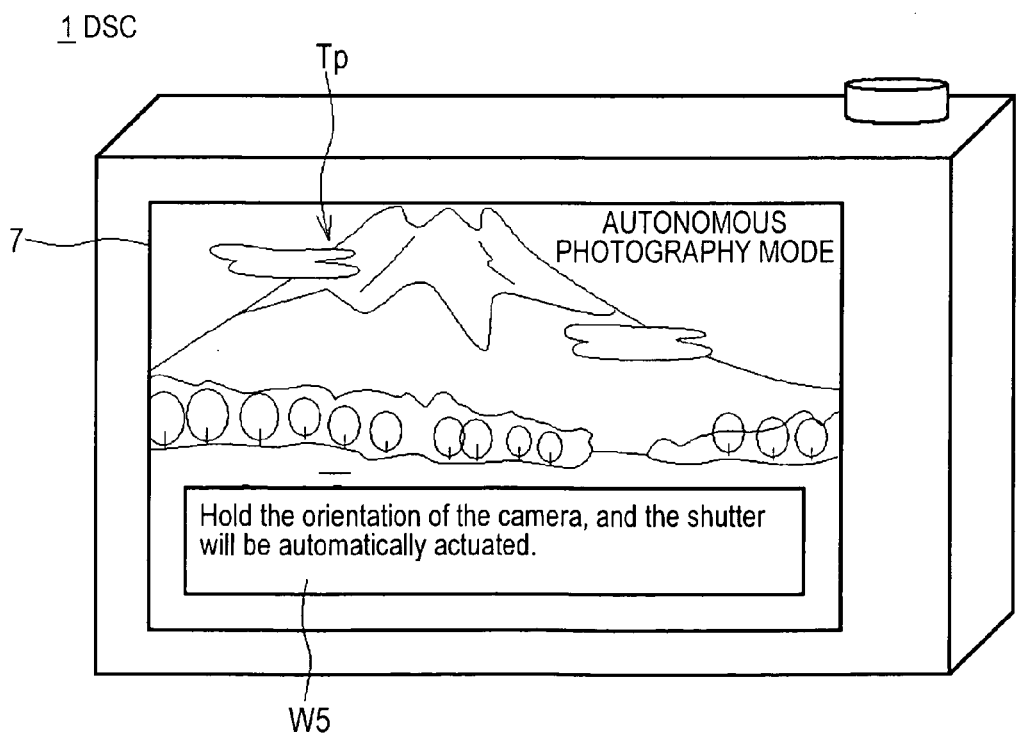
FIG. 15 is a schematic diagram showing an example of display presented in order to prompt a user to hold the orientation of the DSC.

At step SP204, the control unit 10 displays, as shown in FIG. 15, a child window W5, in which literal information signifying that a user is asked to hold the orientation of the DSC 1 is displayed, on the liquid crystal display 16 while superimposing the child window W5 on a through image Tp, and proceeds to step SP205.

At step SP205, the control unit 10 optimizes the set values specified in the index 30 according to the abilities of the DSC 1, determines a camera setting on the basis of the optimized set values, and proceeds to step SP206.

At step SP206, the control unit 10 controls the imaging unit 14 to actuate an electronic shutter, thus autonomously performs photography at the current position, and terminates the autonomous photographing processing procedure RT3.

As mentioned above, when a current position is a photographic point registered in association with an index 30, and the DSC 1 is oriented in a photographic azimuth specified in the index 30, the control unit 10 autonomously performs photography.

In contrast, when obtaining a negative result at step SP203 because the magnitude of the deviation exceeds the permissible range, the control unit 10 proceeds to step SP207.

At step SP207, the control unit 10 decides whether the direction of the deviation is a leftward direction.

When obtaining a positive result at step SP207 because the direction of the deviation is the leftward direction, that is, the current azimuth of the DSC 1 is deviated leftward from the photographic azimuth specified in the index 30, the control unit 10 proceeds to step SP208.

Figure 16:
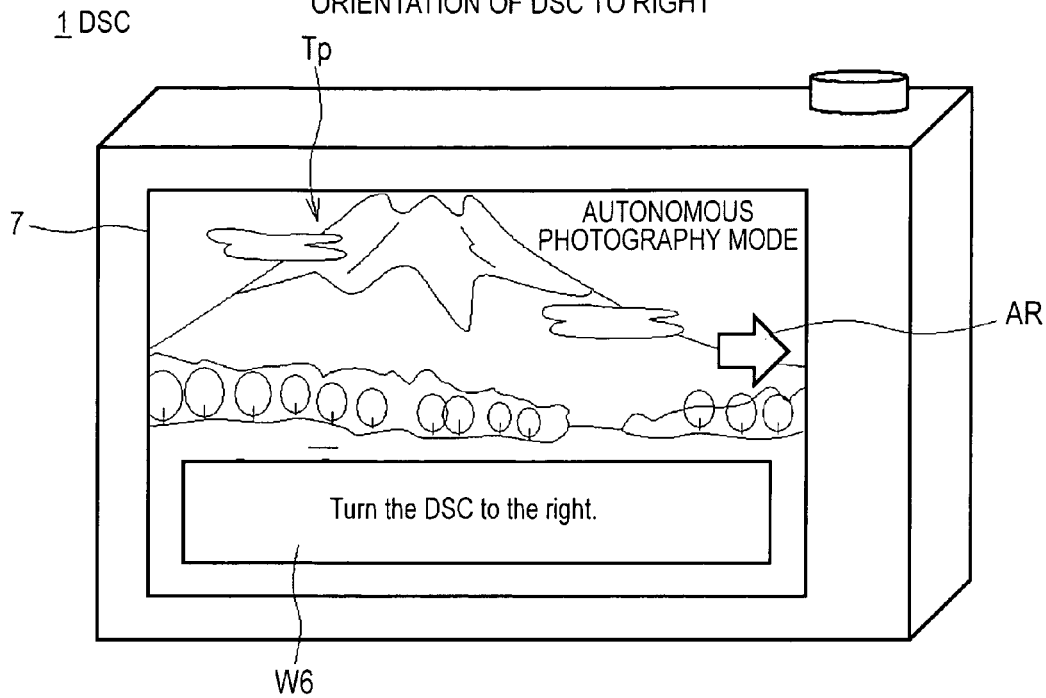
FIG. 16 is a schematic diagram showing an example of display presented in order to prompt a user to change the orientation of the DSC to the right.

At step SP208, the control unit 10 displays, as shown in FIG. 16, a child window W6, in which literal information signifying that a user is prompted to change the orientation of the DSC 1 to the right is displayed, on the liquid crystal display 16 while superposing the child window W6 on a through image Tp, and proceeds to step SP209. At this time, an arrow AR pointing to the right may be displayed together with the child window W6.

In contrast, when obtaining a negative result at step SP207 because the direction of the deviation is a rightward direction, that is, the current azimuth of the DSC 1 is deviated rightward from the photographic azimuth specified in the index 30, the control unit 10 proceeds to step SP210.

Figure 17:
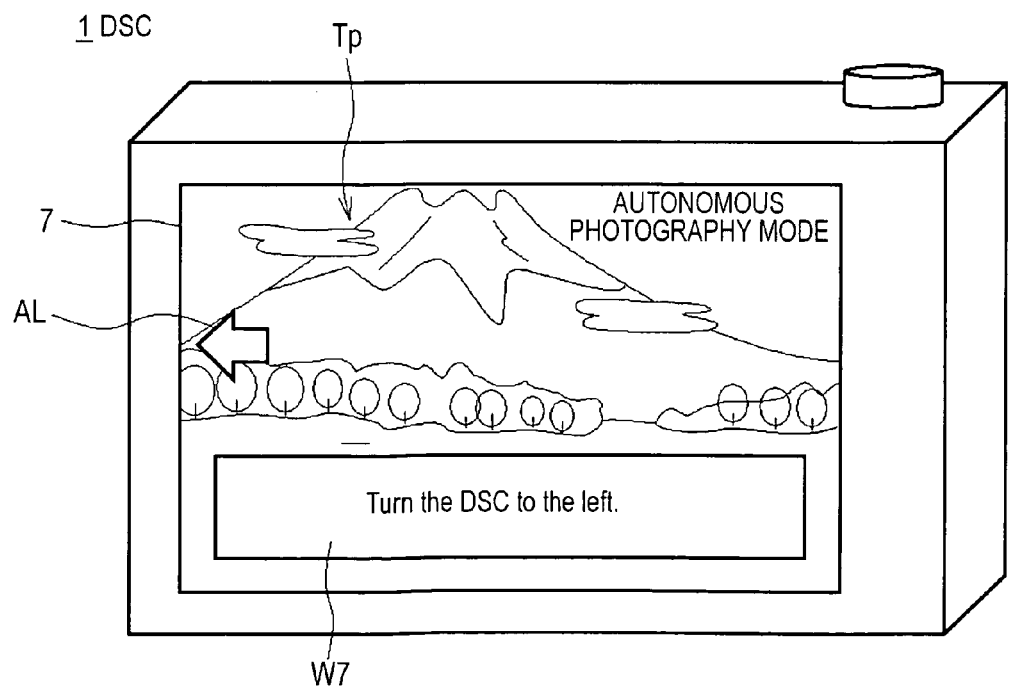
FIG. 17 is a schematic diagram showing an example of display presented in order to prompt a user to change the orientation of the DSC to the left.

At step SP210, the control unit 10 displays, as shown in FIG. 17, a child window W7, in which literal information signifying that a user is prompted to change the orientation of the DSC 1 to the left is displayed, on the liquid crystal display 16 while superposing the child window W7 on the through image Tp, and proceeds to step SP209. At this time, an arrow AL pointing to the left may be displayed together with the child window W7.

As mentioned above, when the current azimuth of the DSC 1 is deviated from the photographic azimuth specified in the index 30, the control unit 10 prompts a user to change the orientation of the DSC 1 to a direction permitting the deviation to be canceled out.

After standing by for, for example, 1 sec at step SP209, the control unit 10 proceeds to step SP211. At step SP211, the control unit 10 decides whether, for example, 10 sec has elapsed since the index 30 associated with the current position is found at step SP6.

When obtaining a negative result at step SP211 because 10 sec has not elapsed, the control unit 10 returns to step SP4, and acquires azimuthal information again. If the current azimuth of the DSC 1 is still deviated, the control unit 10 prompts a user to change the orientation of the DSC 1 to a direction permitting the deviation to be canceled out. When the deviation is canceled out, the control unit autonomously performs photography.

In contrast, assume that the control unit 10 obtains a positive result at step SP210 because 10 sec has elapsed. This means that after the user is prompted to change the orientation of the DSC 1 to a direction permitting the deviation to be canceled out, although 10 sec has elapsed, the deviation is not canceled out.

At this time, the control unit 10 proceeds to step SP201, and decides whether switching from the autonomous photography mode to any other mode has been instructed.

Owing to the foregoing autonomous photographing processing procedure RT3, the DSC 1 autonomously performs photography.

[3-2. Actions to be Performed in the Third Embodiment and Advantage to be Provided Thereby]

As mentioned above, when the control unit 10 of the DSC 1 searches for and finds an index 30 associated with a current position, the control unit 10 acquires the current azimuth of the DSC 1.

The control unit 10 obtains a deviation of the current azimuth of the DSC 1 from a photographic azimuth suitable for photography at the current position and specified in the index 30.

If the deviation exceeds the permissible range, the control unit 10 prompts a user to change the orientation of the DSC 1 to a direction permitting the deviation to be canceled out.

When the deviation falls within the permissible range (that is, the current azimuth of the DSC 1 corresponds to or nearly corresponds to the photographic azimuth specified in the index 30), the control unit 10 autonomously performs photography in a camera setting represented by the index 30.

Accordingly, when merely prompting a user to orient the lens 3 in the photographic azimuth suitable for photography at the current position, the DSC 1 can autonomously determine a camera setting suitable for the current position and perform photography.

4. Variants

[4-1. Variant 1]

In the aforesaid first to third embodiments, the autonomous setting file 32 including the plural indices 30 associated with places and the management information 31 for use in managing the indices is written in advance in the flash memory 11 of the DSC 1.

Alternatively, for example, responsively to a user's manipulation, the control unit 10 of the DSC 1 may download the autonomous setting file 32 from a server connected via the wireless LAN module 28, and write it in the flash memory 11.

In this case, the control unit 10 may download the autonomous setting file 32 of the latest version from the server, and update the autonomous setting file 32 of the previous version stored in the flash memory 11.

By utilizing Exif information appended to a still-image file, the control unit 10 may update the autonomous setting file 32 stored in the flash memory 11.

In this case, at a time of still-image photography, the control unit 10 of the DSC 1 specifies current positional information, which is obtained by the GPS module 28 (that is, positional information representing a place in which a still image is taken), in the Exif information appended to the still-image file.

As a result, Exif information specifying set values, which define a camera setting for photography, and positional information representing a place of photography is contained in each of still-image files stored in the recording medium of the DSC 1.

When instructed at the operating input unit 13 to update the autonomous setting file 32, the control unit 10 samples positional information representing a place, where a still image is taken, and set values, which define a camera setting employed for the photography, from the Exif information contained in each of the still-image files stored in the recording medium.

Thereafter, the control unit 10 retrieves an index 30, which is associated with a photographic point that is a place indicated with the positional information sampled from the still-image file, from among the indices 30, which are registered in the autonomous setting file 32, in units of a still-image file. The index 30 associated with the photographic point that is the place indicated with the positional information sampled from the still-image file may be called an index 30 relevant to the still-image file.

A still-image file whose relevant index 30 is found is a file stored in the recording medium by performing photography at the photographic point registered in association with the index 30. In contrast, a still-image file whose relevant index 30 is not found is a file stored in the recording medium by performing photography in a place that is not registered in association with an index 30.

Based on positional information sampled from a still-image file whose relevant index 30 has not been found, and set values defining a camera setting and being sampled therefrom, the control unit 10 produces a new index 30 associated with a place, which is indicated with the positional information, as a photographic point.

The control unit 10 adds the produced index 30 to the autonomous setting file 32, rewrites the relative positions of each index 30 and the management information 31 according to the addition, and thus updates the autonomous setting file 32.

As a result, in addition to the indices 30 associated with preregistered photographic points, the index associated with the place in which photography has been performed in the past by utilizing the DSC 1 is registered in the autonomous setting file 32.

Accordingly, even in a place that is not registered in advance in association with an index 30, as long as the place is a place where photography has been performed in the past, the DSC 1 can perform photography in a camera setting identical to the camera setting employed when photography has been performed in the past.

As for an index 30 additionally registered as mentioned above, a user may be allowed to enter a degree of recommendation and a comment.

Further, based on positional information sampled from a still-image file whose relevant index 30 has been found, and set values defining a camera setting and being sampled therefrom, the index 30 relevant to the still-image file may be updated.

Further, the control unit 10 may sample positional information and set values defining a camera setting from a still-image file selected by a user from among still-image files, and update or newly create an index 30 on the basis of the positional information and set values.

In this case, for example, still images represented by still-image files whose relevant indices 30 have not been found may be displayed in the form of a list on the liquid crystal display 16, and a desired still-image file may be selected from among the still images.

Exif information on a still-image file stored in the recording medium may not be utilized, but positional information for photography and set values defining a camera setting employed for the photography may be used to update or newly produce an index 30 at the time of photography.

Further, the control unit 10 may upload the updated autonomous setting file 32 into a server connected via the wireless LAN module 28 so as to thus release the autonomous setting file to other users.

Further, at a time of still-image photography, the control unit 10 may specify not only positional information and set values defining a camera setting but also azimuthal information and a date of photography in Exif information appended to a still-image file. The control unit 10 may sample the positional information, the set values defining a camera setting, the azimuthal information, and the date of photography from the Exif information, and update the autonomous setting file 32 on the basis of the data items.

Further, the autonomous setting file 32 may be updated based on not only the Exif information appended to a still-image file but also appendant information of a motion-picture audio file.

In this case, at a time of motion-picture photography, the control unit 10 specifies set values defining a camera setting for the photography and current positional information (that is, positional information on a place where a motion picture is taken) in the appendant information of a motion-picture audio file.

Accordingly, a motion-picture audio file contains, similarly to a still-image file, set values defining a camera setting employed for photography, and positional information on a place of photography.

The control unit 10 samples the set values defining a camera setting employed for photography, and positional information on a place of photography from a motion-picture audio file, and updates or newly produces an index 30 on the basis of the set values and positional information.

Herein, when an index 30 is updated or newly produced based on pieces of information sampled from a still-image file, the still-image photography mode is adopted as a photography mode to be specified in the index 30. In contrast, when an index 30 is updated or newly produced based on pieces of information sampled from a motion-picture audio file, the motion-picture photography mode is adopted as the photography mode to be specified in the index 30.

[4-2. Variant 2]

In the aforesaid first to third embodiments, the position of a photographic point and set values defining a camera setting suitable for photography at the photographic point are specified in each index 30.

Alternatively, set values for daytime that are suitable for photography to be performed at a photographic point during daytime, or set values for nighttime that are suitable for photography to be performed during nighttime may be specified in each index 30. Namely, set values may be specified for each time or date in each index 30.

In this case, the control unit 10 of the DSC 1 retrieves an index 30 associated with a current position, and then acquires set values, which define a camera setting suitable for a current date, from the index 30.

Accordingly, the DSC 1 can perform photography in a camera setting suitable for a place of photography, a time of photography, or a date of photography.

If a recommended time is, for example, night, the control unit 10 may autonomously switch a mode to a night-piece mode suitable for photography at night.

[4-3. Variant 3]

In the aforesaid first embodiment, the DSC 1 compares the type of light source, which is one of photographic conditions decided by the DSC 1, with the type of light source specified in an index 30, and thus decides the reliability of a recommended camera setting represented by the index 30.

Alternatively, for example, a distance to a subject that is one of current photographic conditions decided by the DSC 1 may be compared with a type of photographic scene specified in an index 30 in order to decide reliability.

In this case, the control unit 10 identifies a type of photographic scene according to the decided distance to a subject. If the identified type of photographic scene is identical to the type of photographic scene specified in the index 30, the control unit 10 decides that the reliability of the recommended camera setting is higher than that of a normal camera setting.

[4-4. Variant 4]

In the aforesaid first to third embodiments, a degree of recommendation determined in advance based on the popularity of a photographic point or the like is specified in each index 30. Alternatively, the degree of recommendation specified in each index 30 may be updated based on, for example, the number of times of photography performed at the photographic point.

In this case, the control unit 10 stores the number of times of photography performed at a photographic point as photographic-frequency information in the flash memory 11 in relation to each index 30. Based on the photographic-frequency information, the control unit 10 upgrades by one step a degree of recommendation specified in an index 30 associated with a photographic point at which photography has been performed by a predetermined number of times (for example, ten times) or more.

Accordingly, the likes of a user of the DSC 1 can be reflected on the degree of recommendation in each index 30.

When the degree of recommendation is updated as mentioned above, the DSC 1 in accordance with the second embodiment can preferentially prompt photography at a photographic point at which photography has been performed a large number of times in the past.

[4-5. Variant 5]

In the aforesaid second embodiment, whether photography at a current position is prompted is decided based on a degree of recommendation specified in an index 30 associated with the current position, and the remaining battery capacity of the DSC 1 or the remaining storage capacity of the recording medium.

Alternatively, for example, a user may be prompted to select a threshold for degrees of recommendation in advance (for example, 3). Based on whether a degree of recommendation specified in an index 30 is equal to or larger than the threshold, whether photography at a current position is prompted may be decided.

[4-6. Variant 6]

In the aforesaid first embodiment, when the reliability of a recommended camera setting specified in an index 30 is higher than that of a normal camera setting, the camera settings are automatically changed from the normal camera setting to the recommended camera setting.

Figure 18:
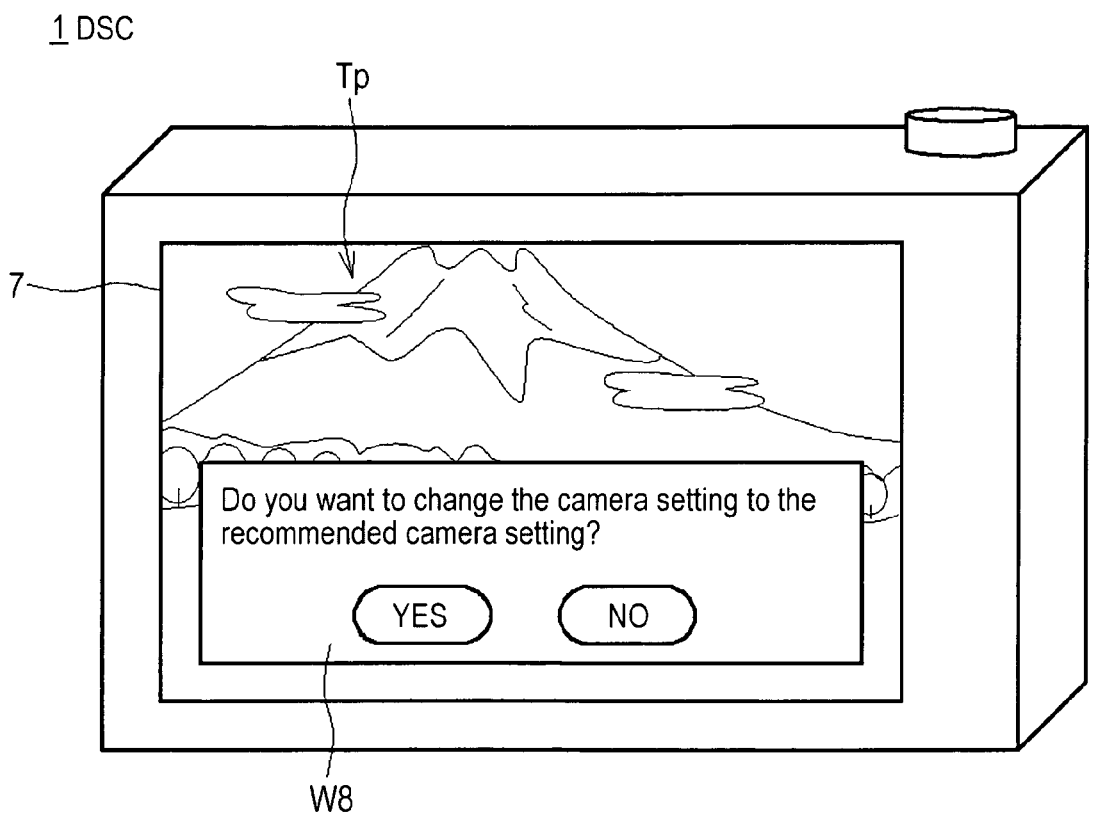
FIG. 18 is a schematic diagram showing an example of display presented in order to prompt a user to select whether a camera setting is changed to a recommended camera setting.

Alternatively, a user may be prompted to select whether the camera setting is changed to the recommended camera setting. In this case, the control unit 10 displays, as shown in FIG. 18, a child window W8, in which two options for use in prompting a user to select whether the camera setting is changed to the recommended camera setting are displayed, on the liquid crystal display 16.

When the option for changing the camera setting to the recommended camera setting is selected at the operating input unit 13, the control unit 10 recognizes that switching the camera setting to the recommended camera setting has been instructed, and changes the camera settings from the normal camera setting to the recommended camera setting.

For example, the set values defining the normal camera setting and the set values defining the recommended camera setting may be displayed on the liquid crystal display so that a user can check the sets of set values. Thereafter, the user may be prompted to select whether the normal camera setting is changed to the recommended camera setting.

[4-7. Variant 7]

In the aforesaid second embodiment, when an index 30 associated with a current position is found, that is, when the current position is a recommended photographic point, a user is prompted to perform photography at the current position.

Alternatively, when a current position is a recommended photographic point, if a current date corresponds to a recommended time and a recommended day which are specified in an index 30, a user may be prompted to perform photography at the current position.

[4-8. Variant 8]

In the aforesaid second embodiment, after the DSC 1 validates the photography prompting facility responsively to a user's manipulation, if an index 30 associated with a current position is found, a user is prompted to perform photography by outputting a beep, displaying literal information, or vibrating the housing.

During a period from when the control unit 10 validates the photography prompting facility to when a user is prompted to perform photography at a current position, an operating mode may be switched to a sleep mode in which only hardware necessary to retrieve an index 30 is allowed to operate.

Accordingly, the power consumption of the DSC 1 for retrieval of an index 30 can be minimized. As a result, the operating time of the DSC 1 can be prolonged.

Photography at a current position is prompted by outputting a beep, displaying literal information, or vibrating the housing. Alternatively, photography at the current position may be prompted according to any other method, for example, by outputting guiding voice.

After photography at a current position is prompted, the control unit 10 may autonomously switch an operating mode to the photography mode.

[4-9. Variant 9]

In the aforesaid second embodiment, after photography at a current position is prompted, the photography mode of the DSC 1 is set to the still-image photography mode or motion-picture photography mode according to a photography mode specified in an index 30 associated with the current position.

Alternatively, the photography mode of the DSC 1 may be designated based on, for example, a photography mode specified in an index 30, the remaining battery capacity, and the remaining storage capacity of the recording medium.

For example, even when the photography mode specified in an index 30 is the motion-picture photography mode, if the remaining battery capacity falls below, for example, 50% or the remaining storage capacity of the recording medium falls below, for example, 30%, the photography mode is set to the still-image photography mode.

Accordingly, the DSC 1 can perform photography in a photography mode suitable for the state of the DSC 1 attained at a time of photography (the remaining battery capacity and the remaining storage capacity of the recording medium).

[4-10. Variant 10]

In the aforesaid first to third embodiments, set values of an exposure time, an f-number, an exposure program, an ISO speed, a shutter speed, and an aperture value are specified as set values, which define a camera setting, in each index 30. Further, set values of an exposure correction value, a type of light source, a flash lamp, a flashlight intensity, an exposure mode, a white-balance (WB) mode, a distance to a subject, a subject region, and a type of photographic scene are specified as various set values, which define a camera setting, in each index 30.

Alternatively, other set values defined to be specified in Exif information may be specified in each index 30.

For example, a set value indicating a metering mode and a set value indicating a digital zooming ratio, which are defined to be specified in Exif information, may be specified.

Not only set values defining a camera setting and concerning the action of the imaging unit 14 but also set values defining a camera setting and concerning image processing may be specified in each index 30.

Aside from Exif information, other various set values may be specified in each index 30 as long as the set values define a setting (photographic setting) concerning photography.

If any of various set values defining a camera setting and being supported by the DSC 1 is not specified in an index 30, the control unit 10 may decide the conditions in a place of photography and determine the set value on the basis of the conditions.

Further, a user may be allowed to select whether the set values defining the normal camera setting or the set values defining the recommended camera setting and being specified in an index 30 are adopted as various set values defining a camera setting and being supported by the DSC 1.

Further, the control unit 10 may control the zooming magnification of the imaging unit 14 on the basis of a distance to a subject, which is specified in an index 30, so that the whole of an entity (for example, a building), which is a subject, will be visualized in a taken image.

[4-11. Variant 11]

In the aforesaid first to third embodiments, an index 30 associated with a photographic point located closest to a current position is retrieved by tracing indices 30, which are associated with photographic points located closer to the current position, with the photographic point associated with any of the regional representative indices 30 as an origin.

Alternatively, the index 30 associated with the photographic point located closest to the current position may be retrieved according to any of other various retrieving methods.

For example, distances of a current position from photographic points associated with indices 30 may be calculated, and the index 30 associated with the photographic point located at the shortest distance may be adopted as the index 30 associated with the photographic point located closest to the current position.

[4-12. Variant 12]

Further, in the aforesaid first to third embodiments, an index 30 associated with a photographic point that is located closest to a current position and lies within a predetermined range D from the current position is treated as an index 30 associated with the current position.

Herein, the predetermined range D may be varied depending on, for example, the moving speed of the DSC 1.

In this case, the control unit 10 calculates the moving speed of the DSC 1 on the basis of, for example, current positional information acquired from the GPS module 26 at intervals of a predetermined time.

The control unit 10 varies the predetermined range D so that when the moving speed increases, the predetermined range D will get wider.

At this time, a range within which the DSC 1 can be moved from a current position during a predetermined time (for example, about several minutes) may be adopted as the predetermined range D.

Accordingly, when a user is walking, the DSC 1 retrieves an index 30 associated with a photographic point that lies within a range of several tens of meters from a current position. When the user has taken a train, an index associated with a photographic point that lies within a range of several kilometers from the current position may be retrieved.

When plural indices 30 are associated with photographic points that lie within the predetermined range D from a current position, the control unit 10 may treat an index 30, which is associated with a photographic point having the highest degree of recommendation assigned thereto, as an index 30 associated with the current position.

Further, the control unit 10 may display a map having a current position indicated in the center thereof, and display a mark, which indicates a photographic point (recommended photographic point) registered in association with an index 30, and a circle indicating the predetermined range D.

Accordingly, the DSC 1 can help a user easily recognize in what direction with respect to a current position and at what distance the recommended photographic point lies.

[4-13. Variant 13]

Further, in the aforesaid first and second embodiments, after a camera setting is determined, when the shutter button 5 is depressed, the electronic shutter is actuated in order to achieve photography.

Alternatively, the control unit 10 may designate a certain time for a timer responsively to, for example, a user's manipulation. After the shutter button 5 is depressed, when the designated time has elapsed, the electronic shutter may be actuated in order to achieve photography.

In the third embodiment, the control unit 10 may designate a time for a timer responsively to, for example, a user's manipulation. As long as the current azimuth of the DSC 1 and the photographic azimuth specified in an index 30 are identical to each other, when the designated time has elapsed, the electronic shutter may be actuated.

[4-14. Variant 14]

In the aforesaid first to third embodiments, the DSC 1 that is imaging equipment is provided with the GPS module 26 serving as a position acquisition unit. In addition, the DSC is provided with the flash memory 11 serving as a memory unit in which plural pieces of setting information are stored in advance. Further, the DSC 1 is provided with the control unit 10 serving as a control unit and a remaining storage capacity detection unit that detects the remaining storage capacity of the recording medium. Further, the DSC 1 is provided with the imaging unit 14 serving as an imaging unit. Further, the DSC 1 is provided with the remaining battery capacity monitor 17 serving as a remaining battery capacity detection unit. Further, the DSC 1 is provided with the azimuth sensor 27 serving as an azimuth detection unit.

The present invention is not limited to the foregoing components. The components of the DSC 1 may be realized with any other hardware devices or software programs as long as the hardware devices or software programs have the same capabilities as the foregoing components do. The GPS module 26 may be incorporated in advance in the DSC 1 or may be detachably attachable to the DSC 1 via a predetermined interface.

In the aforesaid first to third embodiments, the present invention is adapted to the DSC 1. Alternatively, the present invention may and can be adapted to other various pieces of equipment including a digital video camera, a portable cellular phone, a portable communication terminal, and a handheld game machine as long as the pieces of equipment include a positioning facility that locates a current position, and have a capability of a camera.

[4-15. Variant 15]

In the aforesaid first to third embodiments, a program for executing autonomous setting processing, photography prompting processing, or autonomous photographing processing is written in the flash memory 11 of the DSC 1.

Alternatively, the program may be recorded in a recording medium, for example, the memory card 19, and the control unit 10 of the DSC 1 may read the program from the recording medium and run it. The program read from the recording medium may be installed in the flash memory 11.

Further, the program may be downloaded from a predetermined server over a network via the wireless LAN module 28, and then installed in the flash memory 11.

[4-16. Variant 16]

The present invention is not limited to the aforesaid first to third embodiments and variants.

Specifically, the present invention can apply to a form realized by arbitrarily combining some or all of the aforesaid first to third embodiments and variants, or a form realized by extracting some of the aforesaid first to third embodiments and variants.

For example, when a camera setting is determined by executing the photography prompting processing implemented in the second embodiment (step SP111), either of the normal camera setting and recommended camera setting may be selected based on reliability in the same manner as it is in the first embodiment (steps SP9 to SP12).

Likewise, when a camera setting is determined by executing the autonomous photographing processing implemented in the third embodiment (step SP205), either of the normal camera setting and recommended camera setting may be selected based on reliability.

In contrast, during the autonomous setting processing implemented in the first embodiment, either of the normal camera setting and recommended camera setting may not be selected based on reliability, but the recommended camera setting may be selected without exception.

Further, for example, during the photography prompting processing implemented in the second embodiment, whether photography is prompted is decided based on the remaining battery capacity and the remaining storage capacity of the recording medium. Alternatively, whether photography is prompted may be decided based on either the remaining battery capacity or the remaining storage capacity of the recording medium.

Further, for example, the photography prompting processing implemented in the second embodiment and the autonomous photographing processing implemented in the third embodiment may be combined. In this case, after the control unit 10 prompts photography at a current position (step SP108), the control unit 10 acquires current azimuthal information. When the current azimuth and the photographic azimuth specified in an index 30 correspond to each other, photography is autonomously performed (steps SP4 to SP211).

The present invention can be widely employed in portable equipment having a capability of a GPS and a capability of a camera.

It should be understood by those skilled in the art that various modifications, combinations, sub-combinations and alterations may occur depending on design requirements and other factors insofar as they are within the scope of the appended claims or the equivalents thereof.

What is claimed is:

1. Imaging equipment comprising:
   a position acquisition unit that acquires a current position;
   a memory unit in which a plurality of pieces of setting information representing photographic settings suitable for photography at positions and being associated in advance with the positions is stored;
   a control unit that reads setting information, which represents a photographic setting suitable for photography at the current position acquired by the position acquisition unit, from the memory unit, and determines a photographic setting according to the setting information; and
   an imaging unit that images a subject according to the photographic setting determined by the control unit,
   wherein:
   an associated position and set values defining a photographic setting suitable for photography at the position are specified in each of the pieces of setting information;
   based on the current position acquired by the position acquisition unit and the position specified in the setting information, the control unit retrieves setting information, which represents a photographic setting suitable for photography at the current position, from among the pieces of setting information stored in the memory unit, and determines a photographic setting on the basis of the set values specified in the setting information obtained as a result of the retrieval;
   the control unit allows the position acquisition unit to acquire a current position at intervals of a predetermined time, and retrieves setting information, which represents a photographic setting suitable for photography at the current position, from among the pieces of setting information, which are stored in the memory unit, on the basis of the current position and the position specified in the setting information at intervals of the predetermined time;
   if setting information representing a photographic setting suitable for photography at the current position is obtained as a result of the retrieval, the control unit prompts a user to perform photography at the current position;
   a degree of recommendation of an associated position is specified in each of the pieces of setting information, in which the degree of recommendation is expressed with a numeral; and
   if setting information representing a photographic setting suitable for photography at a current position is obtained as a result of retrieval, the control unit decides based on the degree of recommendation specified in the setting information whether a user is prompted to perform photography at the current position.

2. The imaging equipment according to claim 1, wherein the control unit adjusts the set values, which are specified in setting information obtained as a result of retrieval, so that the set values will fall within a range of values supported by the imaging equipment.

3. The imaging equipment according to claim 1, wherein the control unit records an image, which is taken by controlling the imaging unit, as an image file in a predetermined recording medium, appends a current position, which is acquired by the position acquisition unit, and set values, which define a photographic setting, to the image file as appendant information, and produces or updates setting information on the basis of the appendant information appended to the image file.

4. The imaging equipment according to claim 1, in which the numeral indicates a level specified from a plurality of levels.

5. Imaging equipment comprising:
   a position acquisition unit that acquires a current position;
   a memory unit in which a plurality of pieces of setting information representing photographic settings suitable for photography at positions and being associated in advance with the positions is stored;
   a control unit that reads setting information, which represents a photographic setting suitable for photography at the current position acquired by the position acquisition unit, from the memory unit, and determines a photographic setting according to the setting information; and
   an imaging unit that images a subject according to the photographic setting determined by the control unit,
   wherein:
   an associated position and set values defining a photographic setting suitable for photography at the position are specified in each of the pieces of setting information;
   based on the current position acquired by the position acquisition unit and the position specified in the setting information, the control unit retrieves setting information, which represents a photographic setting suitable for photography at the current position, from among the pieces of setting information stored in the memory unit, and determines a photographic setting on the basis of the set values specified in the setting information obtained as a result of the retrieval;
   the control unit allows the position acquisition unit to acquire a current position at intervals of a predetermined time, and retrieves setting information, which represents a photographic setting suitable for photography at the current position, from among the pieces of setting information, which are stored in the memory unit, on the basis of the current position and the position specified in the setting information at intervals of the predetermined time;

if setting information representing a photographic setting suitable for photography at the current position is obtained as a result of the retrieval, the control unit prompts a user to perform photography at the current position;

a degree of recommendation of an associated position is specified in each of the pieces of setting information; and if setting information representing a photographic setting suitable for photography at a current position is obtained as a result of retrieval, the control unit decides based on the degree of recommendation specified in the setting information whether a user is prompted to perform photography at the current position, further comprising a remaining battery capacity detection unit that detects a remaining battery capacity, wherein:

based on the degree of recommendation specified in setting information representing a photographic setting suitable for photography at a current position, and the remaining battery capacity obtained from the remaining battery capacity detection unit, the control unit decides whether a user is prompted to perform photography at the current position.

6. Imaging equipment comprising:

a position acquisition unit that acquires a current position;

a memory unit in which a plurality of pieces of setting information representing photographic settings suitable for photography at positions and being associated in advance with the positions is stored;

a control unit that reads setting information, which represents a photographic setting suitable for photography at the current position acquired by the position acquisition unit, from the memory unit, and determines a photographic setting according to the setting information; and an imaging unit that images a subject according to the photographic setting determined by the control unit, wherein:

an associated position and set values defining a photographic setting suitable for photography at the position are specified in each of the pieces of setting information;

based on the current position acquired by the position acquisition unit and the position specified in the setting information, the control unit retrieves setting information, which represents a photographic setting suitable for photography at the current position, from among the pieces of setting information stored in the memory unit, and determines a photographic setting on the basis of the set values specified in the setting information obtained as a result of the retrieval;

the control unit allows the position acquisition unit to acquire a current position at intervals of a predetermined time, and retrieves setting information, which represents a photographic setting suitable for photography at the current position, from among the pieces of setting information, which are stored in the memory unit, on the basis of the current position and the position specified in the setting information at intervals of the predetermined time;

if setting information representing a photographic setting suitable for photography at the current position is obtained as a result of the retrieval, the control unit prompts a user to perform photography at the current position;

a degree of recommendation of an associated position is specified in each of the pieces of setting information; and if setting information representing a photographic setting suitable for photography at a current position is obtained as a result of retrieval, the control unit decides based on the degree of recommendation specified in the setting information whether a user is prompted to perform photography at the current position, further comprising a remaining storage capacity detection unit that detects a remaining storage capacity of a recording medium in which an image obtained by the imaging unit is recorded, wherein:

based on the degree of recommendation specified in setting information representing a photographic setting suitable for photography at a current position, and the remaining storage capacity obtained by the remaining storage capacity detection unit, the control unit decides whether a user is prompted to perform photography at the current position.

7. A photographic setting determination method, comprising the steps of:

allowing a control unit of imaging equipment to read setting information, which represents a photographic setting suitable for photography at a current position acquired by a position acquisition unit, from a memory unit in which a plurality of pieces of setting information representing photographic settings suitable for photography at positions and being associated in advance with the positions is stored; and allowing the control unit to determine a photographic setting on the basis of the setting information, wherein:

an associated position and set values defining a photographic setting suitable for photography at the position are specified in each of the pieces of setting information;

based on the current position acquired by the position acquisition unit and the position specified in the setting information, the control unit retrieves setting information, which represents a photographic setting suitable for photography at the current position, from among the pieces of setting information stored in the memory unit, and determines a photographic setting on the basis of the set values specified in the setting information obtained as a result of the retrieval;

the control unit allows the position acquisition unit to acquire a current position at intervals of a predetermined time, and retrieves setting information, which represents a photographic setting suitable for photography at the current position, from among the pieces of setting information, which are stored in the memory unit, on the basis of the current position and the position specified in the setting information at intervals of the predetermined time;

if setting information representing a photographic setting suitable for photography at the current position is obtained as a result of the retrieval, the control unit prompts a user to perform photography at the current position;

a degree of recommendation of an associated position is specified in each of the pieces of setting information, in which the degree of recommendation is expressed with a numeral; and if setting information representing a photographic setting suitable for photography at a current position is obtained as a result of retrieval, the control unit decides based on the degree of recommendation specified in the setting information whether a user is prompted to perform photography at the current position.

8. The method according to claim 7, in which the numeral indicates a level specified from a plurality of levels.

9. A non-transitory computer readable medium having stored thereon a photographic setting determination program comprising the steps of:

allowing a control unit of imaging equipment to read setting information, which represents a photographic setting suitable for photography at a current position acquired by a position acquisition unit, from a memory unit in which a plurality of pieces of setting information representing photographic settings suitable for photography at positions and being associated in advance with the positions is stored; and allowing the control unit to determine a photographic setting on the basis of the setting information read at the reading step, wherein:

an associated position and set values defining a photographic setting suitable for photography at the position are specified in each of the pieces of setting information;

based on the current position acquired by the position acquisition unit and the position specified in the setting information, the control unit retrieves setting information, which represents a photographic setting suitable for photography at the current position, from among the pieces of setting information stored in the memory unit, and determines a photographic setting on the basis of the set values specified in the setting information obtained as a result of the retrieval;

the control unit allows the position acquisition unit to acquire a current position at intervals of a predetermined time, and retrieves setting information, which represents a photographic setting suitable for photography at the current position, from among the pieces of setting information, which are stored in the memory unit, on the basis of the current position and the position specified in the setting information at intervals of the predetermined time;

if setting information representing a photographic setting suitable for photography at the current position is obtained as a result of the retrieval, the control unit prompts a user to perform photography at the current position;

a degree of recommendation of an associated position is specified in each of the pieces of setting information, in which the degree of recommendation is expressed with a numeral; and if setting information representing a photographic setting suitable for photography at a current position is obtained as a result of retrieval, the control unit decides based on the degree of recommendation specified in the setting information whether a user is prompted to perform photography at the current position.

10. The medium according to claim 9, in which the numeral indicates a level specified from a plurality of levels.

* * * * *